US012647842B2

(12) United States Patent
Suh

(10) Patent No.: US 12,647,842 B2
(45) Date of Patent: Jun. 2, 2026

(54) METHOD AND APPARATUS FOR MOBILITY MANAGEMENT, SESSION MANAGEMENT, OR CONNECTION MANAGEMENT OF USER EQUIPMENT IN MOBILE COMMUNICATION SYSTEM

(71) Applicant: Samsung Electronics Co., Ltd., Suwon-si (KR)

(72) Inventor: Kyungjoo Suh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 208 days.

(21) Appl. No.: 18/553,137

(22) PCT Filed: Mar. 31, 2022

(86) PCT No.: PCT/KR2022/004616
§ 371 (c)(1),
(2) Date: Sep. 28, 2023

(87) PCT Pub. No.: WO2022/211535
PCT Pub. Date: Oct. 6, 2022

(65) Prior Publication Data
US 2024/0196281 A1 Jun. 13, 2024

(30) Foreign Application Priority Data

Mar. 31, 2021 (KR) ........................ 10-2021-0041930
Apr. 12, 2021 (KR) ........................ 10-2021-0047441

(51) Int. Cl.
*H04W 36/00* (2009.01)
*H04W 36/14* (2009.01)
*H04W 68/02* (2009.01)

(52) U.S. Cl.
CPC . *H04W 36/0022* (2013.01); *H04W 36/00698* (2023.05); *H04W 36/1443* (2023.05); *H04W 68/02* (2013.01); *H04W 36/00692* (2023.05)

(58) Field of Classification Search
CPC ....... H04W 36/0022; H04W 36/00698; H04W 36/1443; H04W 68/02; H04W 36/00692;
(Continued)

(56) References Cited

U.S. PATENT DOCUMENTS 10,779,345 B2 9/2020 Faccin
2019/0007992 A1 1/2019 Kim et al.
(Continued)

OTHER PUBLICATIONS

Supplementary Partial European Search Report dated Jun. 17, 2024, in connection with European Application No. 22781654.3, 12 pages.
(Continued)

*Primary Examiner* — Kibrom T Hailu

(57) ABSTRACT

The present disclosure relates to a 5G or pre-5G communication system for supporting a higher data transmission rate than a 4G communication system such as LTE. A method for mobility/session/connection management by user equipment (UE) in a mobile communication system, according to an embodiment of the present disclosure, comprise the steps of: when receiving a paging from an access and mobility management function (AMF) while registered with the AMF, transmitting a service request message to the AMF; receiving a service accept from the AMF; and transmitting a protocol data unit (PDU) session modification request message to the AMF, wherein a first timer may start when transmitting the service request message, and a second timer may start when transmitting the PDU session modification request message.

12 Claims, 13 Drawing Sheets

(58) Field of Classification Search
   CPC ....... H04W 76/22; H04W 4/70; H04W 76/50;
                                               H04W 4/90
   See application file for complete search history.

(56)                      References Cited

U.S. PATENT DOCUMENTS

| | | | |
|---|---|---|---|
| 2019/0059067 A1 | 2/2019 | Lee et al. | |
| 2020/0305118 A1* | 9/2020 | Ryu ...................... | H04W 76/10 |
| 2021/0051577 A1* | 2/2021 | Won ...................... | H04W 48/16 |
| 2021/0058886 A1 | 2/2021 | Youn et al. | |
| 2021/0105064 A1* | 4/2021 | Faccin .................... | H04W 8/08 |
| 2022/0007444 A1* | 1/2022 | Kawasaki ............. | H04W 76/34 |

OTHER PUBLICATIONS

3GPP TR 24.890 V15.1.0 (Mar. 2018), Technical Report, 3rd Generation Partnership Project; Technical Specification Group Core Network and Terminals; 5G System—Phase 1; CT WG1 Aspects (Release 15), Mar. 2018, 316 pages.
International Search Report and Written Opinion of the International Searching Authority dated Jul. 6, 2022, in connection with International Application No. PCT/KR2022/004616, 15 pages.
Huawei, et al., "Interworking to EPS over SM with N26 due to UEs S1 mode capability disabling/enabling," C1-206088, 3GPP TSG-CT WG1 Meeting #126-e, Electronic meeting, Oct. 15-23, 2020, 9 pages.
Samsung, "Ue behavior for user plane data integrity protection with full data rate," C1-205171, 3GPP TSG-CT WG1 Meeting #125-e, Electronic meeting, Aug. 20-28, 2020, 11 pages.
Supplementary European Search Report dated Sep. 9, 2024, in connection with European Application No. 22781654.3, 10 pages.

* cited by examiner

FIG. 7

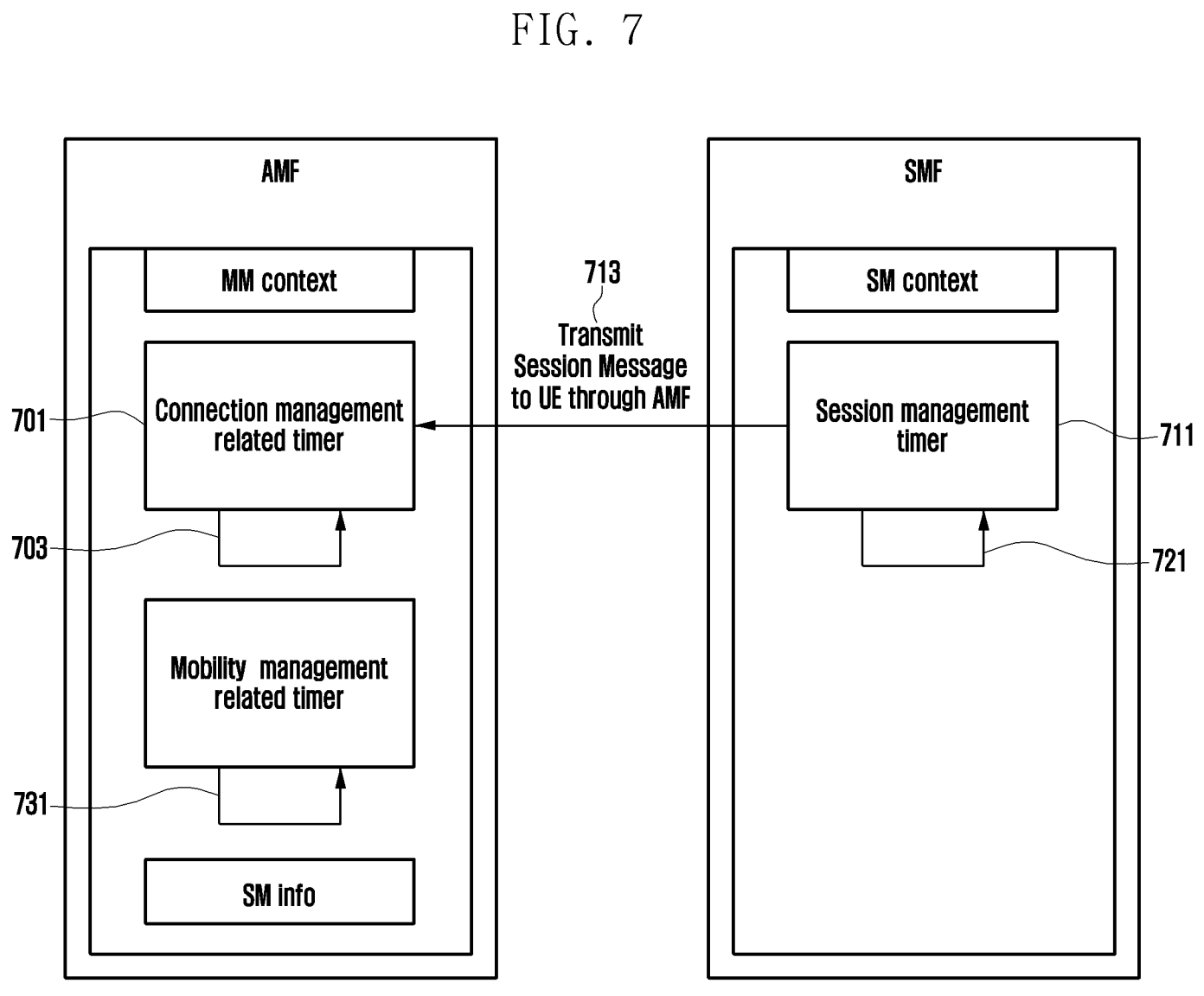

SMF

SM context

Session management timer — 711

721

713
Transmit
Session Message
to UE through AMF

AMF

MM context

Connection management related timer — 701

703

Mobility management related timer

731

SM info

METHOD AND APPARATUS FOR MOBILITY MANAGEMENT, SESSION MANAGEMENT, OR CONNECTION MANAGEMENT OF USER EQUIPMENT IN MOBILE COMMUNICATION SYSTEM

TECHNICAL FIELD

The disclosure relates to apparatus and method for session, mobility, or connection management in a wireless communication system, and more particularly, to a method and an apparatus of a NAS for managing a session, mobility, or connection in a movement situation of a user equipment.

BACKGROUND ART

To meet the increasing demand for wireless data traffic since the deployment of 4G communication systems, efforts have been made to develop an improved 5th generation (5G) or pre-5G communication system. Therefore, the 5G or pre-5G communication system is also called a "beyond 4G network" communication system or a "post long term evolution (LTE) system." The 5G communication system determined in 3GPP is called a "new radio (NR) system". Implementation of the 5G communication system in ultrahigh frequency (mmWave) bands, e.g., 60 GHz bands, is being considered in order to accomplish higher data rates. To mitigate a path loss of radio waves in the ultrahigh frequency bands and increase the transmission distance on the radio waves in the ultrahigh frequency bands, technologies of beamforming, massive multiple-input multiple-output (massive MIMO), full dimensional MIMO (FD-MIMO), array antenna, analog beamforming, and large scale antennas have been discussed for 5G communication systems and applied to the NR system. In addition, in 5G communication systems, development for system network improvement is underway based on evolved small cells, advanced small cells, cloud radio access networks (cloud RANs), ultra-dense networks, device-to-device (D2D) communication, wireless backhaul, moving network, cooperative communication, coordinated multi-points (CoMP), reception-end interference cancellation, and the like. In addition, in the 5G system, hybrid frequency shift keying and quadrature amplitude modulation (FQAM) and sliding window superposition coding (SWSC), as advanced coding modulation (ACM) methods, and filter bank multi carrier (FBMC), non-orthogonal multiple access (NOMA), and sparse code multiple access (SCMA), as advanced access technologies, have been developed.

On the other hand, as the 5G communication system is commercialized after commercialization of the 4G communication system, association between systems has also emerged as an important issue. For example, in case of providing a service to a user equipment (UE) that is subscribed in both the 5G system and the 4G system, it may be necessary to provide the service through the 5G system in some cases and to provide the service through the 4G system in other cases depending on circumstances. In general, these cases may be mostly caused by the mobility of the UE. However, up to now, any method capable of being properly compatible between the 5G system and the 4G system has not been proposed due to the mobility of the UE.

DISCLOSURE OF INVENTION

Technical Problem

Accordingly, the disclosure provides a method and an apparatus for properly providing a service by using any one of a 4G system and a 5G system as user equipment. Further, the disclosure provides a method and an apparatus for providing continuity of a service in case that a network change is necessary due to the mobility of the user equipment.

Solution to Problem

A method according to an embodiment of the disclosure is a method, by a user equipment (UE), for a mobility/session/connection management in a mobile communication system, which may include: transmitting a service request message to an access and mobility management function (AMF) in case of receiving a paging from the AMF in a state of being registered in the AMF; receiving a service accept from the AMF; and transmitting a protocol data unit (PDU) session modification request message to the AMF, wherein a first timer starts in case of transmitting the service request message, and a second timer starts in case of transmitting the PDU session modification request message.

An apparatus according to an embodiment of the disclosure is a user equipment (UE), which may include: a transceiver configured to be able to communicate with a first mobile communication network and a second mobile communication network; a memory; and at least one processor, wherein the at least one processor is configured to:

transmit a service request message to an access and mobility management function (AMF) in case of receiving a paging from the AMF in a state of being registered in the AMF, receive a service accept from the AMF, and control transmission of a protocol data unit (PDU) session modification request message to the AMF, wherein a first timer starts in case of transmitting the service request message, and a second timer starts in case of transmitting the PDU session modification request message.

A method according to another embodiment of the disclosure is a method, by an access and mobility management function (AMF) of a mobile communication network, for a mobility/session/connection management of a user equipment (UE), which may include: receiving an NIN2 message transfer message for notifying that a data transfer is necessary from a session management function (SMF) through a session formed with the registered UE; transmitting a response message to the NIN2 message transfer message to the SMF; transmitting a paging to the UE for the data transmission; receiving, from the UE, a service request message in response to the paging; receiving a protocol data unit (PDU) session modification request message from the UE; and transmitting a PDU update session management (SM) context request message to the SMF in response to the service request message.

An apparatus according to another embodiment of the disclosure is an access and mobility management function (AMF) for a mobility/session/connection management of a user equipment (UE) in a mobile communication network, which may include: a transceiver configured to be able to transmit/receive a message to/from the UE; a memory; and at least one processor, wherein the at least one processor is configured to:

receive an NIN2 message transfer message for notifying that a data transfer is necessary from a session management function (SMF) through a session formed with the registered UE, transmit a response message to the NIN2 message transfer message to the SMF, transmit a paging to the UE for the data transmission, receive, from the UE, a service request message in response to the paging, receive a protocol data unit (PDU) session modification request message from the UE, and control transmission of a PDU update session management (SM) context request message to the SMF in response to the service request message.

According to still another embodiment of the disclosure, an operation method of a network entity in a wireless communication system may include: receiving a registration request message for processing an emergency call from a user equipment through a satellite radio access network (RAN); transmitting an emergency registration request message to a public safety answering point (PSAP) based on the received registration request message; and receiving an emergency registration response message from the PSAP.

Advantageous Effects of Invention

According to an embodiment of the disclosure, it is possible to efficiently support the session/mobility/connection management in the wireless communication system. Further, according to the disclosure, it is possible to properly provide the service by using any one of the 4G system and the 5G system as the user equipment. In particular, it is possible to provide the continuity of the service in case that the network change is necessary due to the mobility of the user equipment.

According to the disclosed embodiment, it is possible to efficiently support the emergency call service in the wireless communication system.

BRIEF DESCRIPTION OF DRAWINGS

FIG. 7 is a diagram illustrating the constitution of a network entity according to an embodiment of the disclosure.

MODE FOR THE INVENTION

Figure 1:
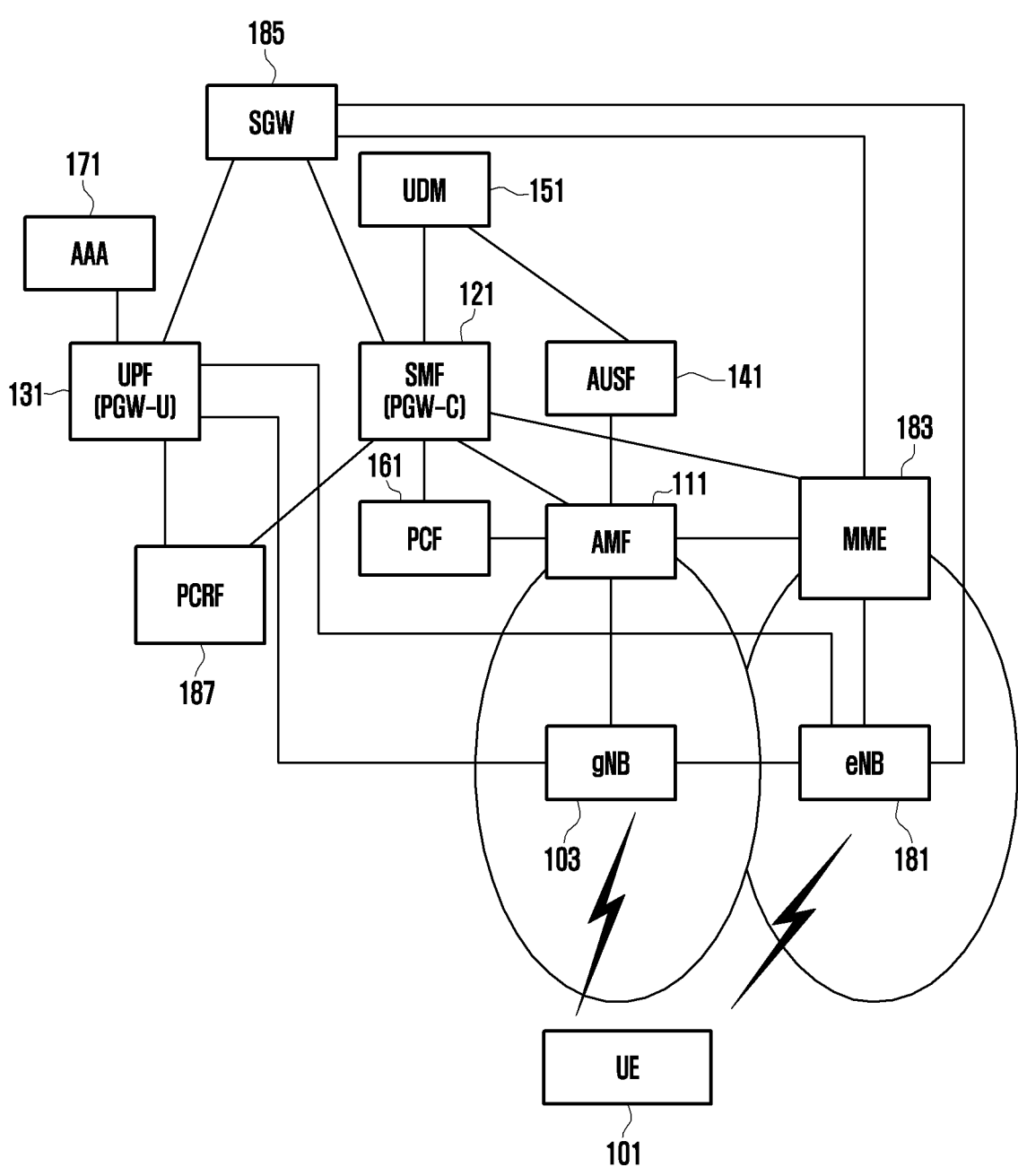
FIG. 1 illustrates an embodiment of a UE and a network environment for mobility management and session management in the network environment in which 4G and 5G coexist according to an embodiment of the disclosure.

Hereinafter, embodiments of the disclosure will be described in detail with reference to the accompanying drawings. In describing the embodiments, explanation of technical contents that are well known in the technical field to which the disclosure pertains and are not directly related to the disclosure will be omitted. This is to transfer the subject matter of the disclosure more clearly without obscuring the same through omission of unnecessary explanations.

For the same reason, in the accompanying drawings, some constituent elements may be exaggerated, omitted, or briefly illustrated. Further, sizes of the respective constituent elements do not completely reflect the actual sizes thereof. In the drawings, the same reference numerals are used for the same or corresponding elements across various figures.

The aspects and features of the disclosure and methods for achieving the aspects and features will be apparent by referring to the embodiments to be described in detail with reference to the accompanying drawings. However, the disclosure is not limited to the embodiments disclosed hereinafter, and it can be implemented in diverse forms. The present embodiments are provided to complete the disclosure and to completely notify those of ordinary skill in the art to which the disclosure pertains of the category of the disclosure, and the disclosure is only defined within the scope of the appended claims. In the entire description of the disclosure, the same reference numerals are used for the same elements across various figures.

In this case, it will be understood that each block of the flowchart illustrations, and combinations of blocks in the flowchart illustrations, can be performed by computer program instructions.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. As an example, two blocks shown in succession may in fact be executed substantially concurrently or the blocks may sometimes be executed in the reverse order, depending upon the functionality involved.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "~unit", as used in an embodiment, means, but is not limited to, a software or hardware component, such as a field programmable gate array (FPGA) or an application specific integrated circuit (ASIC), which performs certain tasks. However, "~unit" is not meant to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". In addition, the components and "~units" may be implemented to operate one or more CPUs in a device or a security multimedia card. Further, in an embodiment, the term "~unit" may include one or more processors.

In describing the disclosure hereunder, a detailed description of a related known function or constitution will be omitted if it is deemed to make the gist of the disclosure unnecessarily vague. Hereinafter, embodiments of the disclosure will be described with reference to the accompanying drawings.

In the following description, a term to identify an access node, a term to denote network entities, a term to denote messages, a term to denote an interface between network entities, and a term to denote a variety of types of identity information have been exemplified for convenience in explanation. Accordingly, the disclosure is not limited to the terms to be described later, and other terms to denote targets having equivalent technical meanings may be used.

In the following description, a term to denote a signal, a term to denote a channel, a term to denote control information, a term to denote network entities, a term to denote a constituent element of a device have been exemplified for convenience in explanation. Accordingly, the disclosure is not limited to the terms to be described later, and other terms having equivalent technical meanings may be used.

In the following description, the terms "physical channel" and "signal" may be used interchangeably with "data" or "control signal". For example, although a physical downlink shared channel (PDSCH) is a term to denote a physical channel on which data is transmitted, it may be used to denote data. That is, in the disclosure, the expression "transmit a physical channel" may be interpreted equivalent to the expression "transmit data or a signal on a physical channel".

Hereinafter, in the disclosure, the term "upper signaling" means a signal transport method for transporting a signal from a base station to a UE by using a downlink data channel of a physical layer, or from the UE to the base station by using an uplink data channel of the physical channel. The upper signaling may be understood as a radio resource control (RRC) signaling or a media access control (MAC) control element (CE).

For convenience in explanation, in the disclosure, terms and names defined in the 3rd Generation Partnership Project Long Term Evolution (3GPP LTE) standards and/or terms and names defined in the 3rd Generation Partnership Project New Radio (3GPP NR) standards, or terms and names modified based on the above-mentioned terms and names are used. However, the disclosure is not restricted by the terms and names, and it may be equally applied even to systems complying with other standards. In the disclosure, for convenience in explanation, an eNB may be interchangeably used with a gNB. That is, a base station that is explained as an eNB may be represented as a gNB. In the disclosure, the term "UE" may represent various wireless communication devices in addition to cellular phones, NB-IOT devices, and sensors.

Hereinafter, a base station is the subject that performs resource allocation to a UE, and may be at least one of gNode B (gNB), eNode B (eNB), Node B, base station (BS), radio access unit, base station controller, or node on a network. A UE may include user equipment (UE), mobile station (MS), cellular phone, smart phone, computer, or multimedia system capable of performing a communication function. Of course, the base station or the UE is not limited thereto.

That is, in describing embodiments of the disclosure in detail, although the main target is the communication standards determined by the 3GPP that is the mobile communication standardization organization, it will be apparent that the main gist of the disclosure can be applied even to other communication systems having the similar technical backgrounds through slight modifications thereof in the range that does not greatly deviate from the scope of the disclosure by the judgment of those skilled in the art to which the disclosure pertains.

First, a 5G system and a 4G system will be briefly described hereinafter.

In a 5G or NR system, an access and mobility management function (AMF) device that is a management entity managing mobility of a UE and a session management function (SMF) device that is an entity managing a session are separated from each other. Accordingly, in the 5G or NR system, unlike a 4G LTE communication system in which a mobility management entity (MME) performs mobility management and session management together, entities that perform the mobility management and the session management are separated from each other, and thus a communication method and a communication management method have been changed between a UE and a network entity.

In the 5G or NR system, with respect to a non-3GPP access, the mobility management is performed through the AMF by means of a 3GPP interworking function (N3IWF) device, and the session management is performed through the SMF. Further, through the AMF, security related information that is an important element in the mobility management is also processed.

As described above, in the 4G LTE system, the MME takes charge of the mobility management and the session management together. In the 5G or NR system, it is possible to support non-standalone architecture (NSA) that performs communication by using network entities of the 4G LTE system together.

In the following description, the term "4G" may mean a 4G LTE system and/or a 4G LTE system network. Accordingly, it is to be noted that the 4G LTE system and/or the 4G LTE system network may be interchangeably used with the 4G. Further, the term "5G" may be used as the same meaning as the NR system and/or NR system network. On the other hand, in the 5G system as described above, since the AMF device and the SMF device are separated from each other, the session management and the mobility management are separated from each other, and through the coordination between them, an operation should be performed smoothly even if two entities are separated from each other in the 5G system unlike the 4G system. In particular, in an environment in which the 4G and the 5G interwork with each other, one entity that is the MME operates in the 4G, whereas two entities operate in a state where the control subjects are separated from each other in the 5G. Even in this case, the operations of the two entities should be performed smoothly in the 5G.

On the other hand, since the 5G is in an environment in which the SMF performs the session management through the AMF, the coordination between the session management that is controlled by the SMF and the mobility management that is controlled by the AMF is necessary.

Further, in the 5G, messages that may be concurrently transmitted for prompt message processing have been defined, and even if the messages are concurrently transmitted, it is required to resolve conflicts between the mobility management and the session management, which may occur due to the concurrent transmission of the messages.

Accordingly, in order to solve the above problems, the disclosure provides an apparatus and a method for session management in a wireless communication system. In the following description of the disclosure, a method for managing a session in a movement situation of a user equipment, for example, a UE.

FIG. 1 illustrates an embodiment of a UE and a network environment for mobility management and session management in the network environment in which 4G and 5G coexist according to an embodiment of the disclosure.

With reference to FIG. 1, a 5G or NR core network may be composed of network function (NF) devices, such as a user plane function (UPF) device 131, a session management function (SMF) device 121, an access and mobility management function (AMF) device 111, a 5G radio access network (RAN) 103 that serves as a base station, a user data management (UDM) device 151, and a policy control function (PCF) device 161. Further, for authentication of such entities, the 5G or NR core network may include entities, such as an authentication server function (AUSF) device 141, and an authentication, authorization, and accounting (AAA) device 171.

User equipment (UE) 101 may be called by different names, such as a terminal, an access terminal (AT), and a mobile terminal (MT) depending on network standard specifications and/or network forms, and the disclosure does not put restrictions on their names. Further, the UE 101 may access the base station (5G radio access network (RAN)) 103 by using a radio channel. The base station 103 may also be called by various names, such as a base-station (BS), an access node (AN), and the like.

On the other hand, in case that the UE 101 performs communication through a non-3GPP access in a state in which an N3 interworking function (N3IWF) device (not illustrated in FIG. 1) exists in order to provide a 5G network service, the session management may be controlled by the UE, the non-3GPP access, the N3IWF, and the SMF 121, and the mobility management may be controlled by the UE, the non-3GPP access, the N3IWF, and the AMF 111. In the 5G or NR system, as described above, the entities performing the mobility management and the session management are separated into the AMF 111 and the SMF 121.

On the other hand, in the 5G or NR system, a standalone deployment structure in which communication is performed only by 5G or NR entities and a non-standalone deployment structure in which a 4G entity and 5G or NR entities are used together have been considered.

FIG. 1 exemplarily illustrates a base station (eNB) 181 for accessing the 4G network, an MME 183 for mobility and session management in the 4G network, and a policy and charging rules function (PCRF) device 187.

As exemplified in FIG. 1, in case of communicating with the 4G network, the UE 101 may communicate with the eNB 181 through a radio channel, the MME 183 may manage the mobility and the session of the UE 101, and the PCRF 187 may provide the policy and charging rules for a service that is provided to the UE 101. As illustrated in FIG. 1, in case that the UE 101 communicates with the 4G network, the control may be performed by the eNB 181, and the deployment in the form in which a 5G entity of the core network is used may be possible. In this case, the mobility management between the UE 101 and the AMF 111 and the session management between the UE 101 and the SMF 121 may be performed by a non-access stratum (NAS) layer that is layer 3. On the other hand, an access stratum (AS) that is layer 2 may be transferred between the UE 101 and the eNB 181.

A serving gateway (SGW) 185 is a network entity for transmitting data to the UE 101 and receiving data from the UE 101. Depending on the kind of the network accessed by the UE 101, for example, if the network accessed by the UE 101 is connected to the LTE base station (eNB) 181, the SGW 185 may be connected to the eNB 181 and may perform transmission/reception of user data, whereas if the network accessed by the UE 101 is connected to the NR base station (gNB) 103, the SGW 185 may perform the transmission/reception of the user data through a UPF 131.

Further, although it is assumed that a communication network on which the disclosure is based is the 5G or 4G LTE network, the same concept may be applied to another system within the scope that those of ordinary skill in the art can understand.

Further, in the following description, for convenience in explanation, it is decided not to mention the word "device" with respect to the network function devices, such as the UPF device 131, the AMF device 111, and the SMF device 121 of the NR core network, that is, in a manner of the UPF 131, the AMF 111, and the SMF 121. Further, the respective network functions may be mounted and implemented on one server so that two or more network functions are performed. As another example, one network function device may be mounted and implemented on one server. As still another example, one network function device may be mounted and implemented on two or more servers. Further, two or more network functions that perform the same functions may be mounted on one server, and the two or more network functions that perform the same functions in one server may provide services to different UEs. As still another example, two or more network functions that perform the same functions may be mounted on one server, and the different network functions that perform the same functions in one server may be mounted on the same UE to correspond to different sessions.

Figure 2:
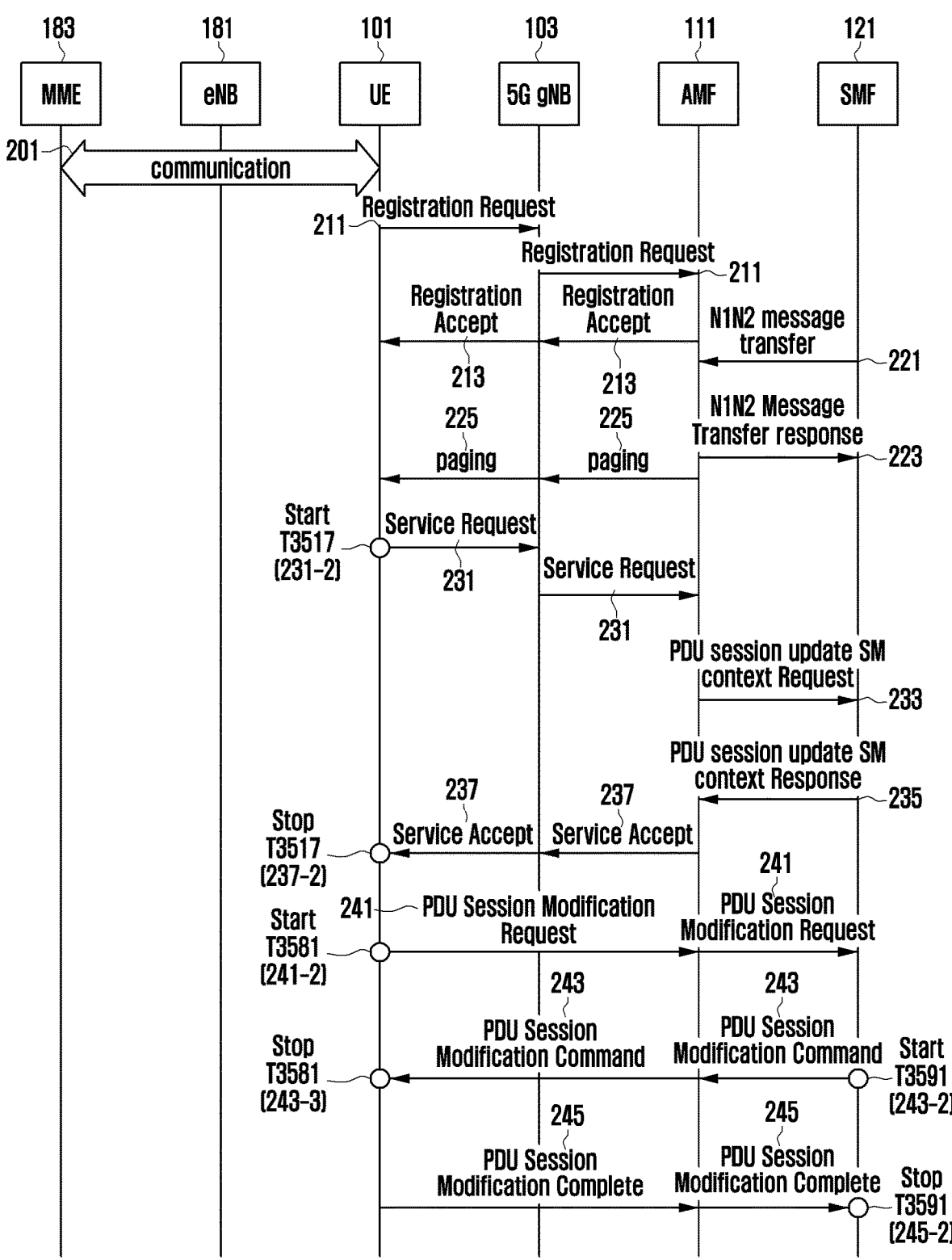
FIG. 2 is a flowchart explaining a procedure for mobility management and session management in a network environment in which 4G and 5G coexist according to an embodiment of the disclosure.

FIG. 2 is a flowchart explaining a procedure for mobility management and session management in a network environment in which 4G and 5G coexist according to an embodiment of the disclosure.

In step 201, it is exemplified that the UE 101 performs communication on the 4G LTE by utilizing the eNB 181 and the MME 183. While performing data communication, the UE 101 may move to the 5G in a handover or idle mode state. That is, while performing data download through a file transfer protocol (FTP), communication reception, or data transmission, the UE 101 may move to the 5G in the handover or idle mode state.

Then, in step 211, the UE 101 may transmit a registration request message to the AMF 111 through the gNB 103.

In step 213, the AMF 111 having received the registration request message from the UE 101 may transmit a registration accept message to the UE 101 through the gNB 103.

Thereafter, a case where the SMF 121 should transmit data through a session formed with the UE 101 may occur at a specific time. Then, in step 221, the SMF 121 may transmit an NIN2 message transfer message to the AMF 111 in case that downlink data exists.

In step 223, the SMF 121 may receive an NIN2 message transfer response message from the AMF 111.

Further, in step 225, the AMF 111 having received the NIN2 message transfer message from the SMF 121 may transmit a paging to the UE 101 through the RAN, for example, the gNB 103.

In step 231, the UE 101 having received the paging may transmit a service request message to the AMF 111. In this case, as shown in step 231-2, the UE 101 may start a timer T3512 while transmitting the service request message. The service request message in the step 231 may be a message related to connection management. In step 233, the AMF 111 having received the service request message may transmit a PDU session update SM context request message to the SMF 121. The step 233 may be applied in various forms according to embodiments described below.

On the other hand, a PDU session modification request message in step 241 is related to the session management, and may be carried on an uplink (UL) NAS transport message being sent to the AMF 111. The step 241 may also be applied in various forms according to the embodiments described below.

In this case, the following embodiments are possible in relation to the operations of the UE 101, the AMF 111, and the SMF 121.

First, from the position of the UE 101, the following embodiments are possible.

Case 1-1) As an embodiment of the UE 101, from the position of the UE 101, it is possible to concurrently transmit the PDU session modification request message in the step 241 and the service request message in the step 231.

Case 1-2) As another embodiment of the UE 101, from the position of the UE 101, a case may occur, where the service request message in the step 231, as exemplified in FIG. 2, is transmitted earlier than the PDU session modification request message in the step 241.

Case 1-3) As still another embodiment of the UE 101, from the position of the UE 101, it is possible to start a connection management timer T3517 and then to start a session management timer T3581 before the T3517 is stopped.

However, in case that the connection management timer T3517 starts, and then the session management timer T3581 starts before the T3517 is stopped, a case where the T3581 expires occurs, and if the T3581 expires, the PDU session modification request message is retransmitted.

Case 1-4) As still another embodiment of the UE 101, the following cases are possible. In case that the AMF 111 receives the service request message in the step 231 and then receives the PDU session modification request message in the step 241, the AMF 111 may be implemented to finish transmission of a PDU session update SM context request message to the SMF 121 in the step 233 to correspond to the reception of the service request message in the step 231. In this case, before a response corresponding to the step 233, that is, a PDU session update SM context response message in step

235, is received, it is not possible to forward the PDU session modification request message in the step 241.

Accordingly, since a payload representing the PDU session modification request message is not forwarded as described above, that is, due to cause #90, a DL NAS transport message may be transmitted from the AMF 111 to the UE 101 through step 243-2. That is, the UE 101 may receive cause #90 through a response message to the downlink (DL) non-access stratum (NAS) transport message in the step 241.

Case 1-5) As still another embodiment of the UE 101, in case that the AMF 111 receives the service request message in the step 231 and then receives the PDU session modification request message in the step 241, the AMF 111 may transmit, to the SMF 121, the PDU session update SM context request message in the step 233 for the service request message in the step 231. In this case, before a response message corresponding to the step 233 is received, it is not possible to forward the PDU session modification in the step 241 to the SMF 121. Accordingly, in case that the payload representing the PDU session modification request message is not forwarded as described above, from the position of the UE 101, the T3581 expires, and the PDU session modification request message can be retransmitted.

Case 1-6) As still another embodiment of the UE 101, from the position of the UE 101, it may be possible to first transmit the PDU session modification message in the step 241, and then to transmit the service request message in the step 231 later.

Case 1-7) As still another embodiment of the UE 101, from the position of the UE 101, it is possible to start the session management timer T3581 and then to start the connection management timer T3517 before the T3581 is stopped. However, in case that the session management timer T3581 starts, and then the connection management timer T3517 starts before the T3581 is stopped, a case occurs, where processing of the service request message in the network is delayed, and the T3517 first expires. If the T3517 expires, the procedure is aborted.

Next, from the position of the AMF 111 in the position of the network, the following embodiments are possible.

Case 2-1) As an embodiment of the AMF 111, in case that the AMF 111 receives the service request message in the step 231 and then receives the PDU session modification request message in the step 241, the AMF 111 may transmit the PDU session update SM context request message to the SMF 121 in the step 233 for the service request message in the step 231. In this case, while a response in the step 233 comes, it is not possible to forward the PDU session modification request message for the step 241 to the SMF 121. Accordingly, since the payload representing the PDU session modification request message is not forwarded as described above, that is, due to cause #90, the DL NAS transport message may be transmitted from the AMF 111 to the UE 101 through the step 243-2.

Case 2-2) As another embodiment of the AMF 111, in case that the AMF 111 receives a PDU session modification command message from the SMF 121 and transmits the message to the UE 101 as in the step 243 in relation to the PDU session modification message, the AMF 111 may transmit the PDU session update SM context request message in the step 233, being related to the received service request message in the step 231, to the SMF 121 after finishing the step 245, that is, after completing the transmission of the PDU session modification complete message, even if the service request message is received from the UE 101 in the middle as in the step 231, before receiving the PDU session modification complete message that is a response message from the UE 101 and transmits the message to the SMF 121.

Case 2-3) As still another embodiment of the AMF 111, in case that the service request message in the step 231 is received before the PDU session modification complete message that is a response to the PDU session modification message in the step 243 is received, the AMF 111 may discard the service request message.

Next, from the different position of the network, that is, from the position of the SMF 121, the following embodiments are possible.

Case 3-1) As an embodiment of the SMF 121, if the timer T3591 is running in case that the SMF 121 transmits the PDU session modification command message to the UE 101 in the step 243, the timer T3591 keeps running until the PDU session modification complete message that is a response message is received from the UE 101. Accordingly, the SMF 121 is unable to receive the PDU session update SM context request message from the AMF 111 as in the step 233 before the timer T3591 is stopped. That is, even if there is the service request message from the UE 101 to the AMF 111, the SMF 121 is unable to receive the PDU session update SM context request message from the AMF 111 as in the step 233.

On the other hand, if the service request message is received from the UE 101, the AMF 111 transmits the PDU session update SM context request message to the SMF 121 as in the step 233.

Thereafter, the AMF 111 receives the PDU session update SM context response message from the SMF 121 in the step 235.

In step 237, the AMF 111 may transmit a service accept message to the UE 101.

If the service accept message is received in step 237-2, the UE 101 may stop the timer T3517.

In step 241, the UE 101 may transmit the PDU session modification request message to the SMF 121 through the AMF 111. That is, the UE 101 may include the PDU session modification request in an uplink (UL) NAS transport message, and may transmit the PDU session modification request message to the SMF 121 through the AMF 111. In this case, the UL NAS transport message, being transmitted to a UE-AMF section, may include, in its payload, the PDU session modification request message, being transmitted to a UE-SMF section.

Accordingly, in step 241-2, the UE 101 may start the timer T3581 that is a timer managing the PDU session modification request message.

In step 243, the SMF 121 may transmit the PDU session modification command message to the UE 101 through the AMF 111. The PDU session modification command message may be included in the DL NAS transport message, and may be transmitted from the AMF 111 to the UE 101.

In step 243-2, the SMF 121 may set the timer T3591 while transmitting the PDU session modification command message.

Further, in step 243-3, the UE 101 having received the PDU session modification request message from the SMF 121 may stop the timer T3581 set in the step 241-2.

In step 245, the UE 101 may transmit the PDU session modification complete message to the SMF 121.

In step 245-2, the SMF 121 may stop the timer T3591 in case of receiving the PDU session modification complete message that is a response message to the PDU session modification command message from the UE 101.

Figure 3:
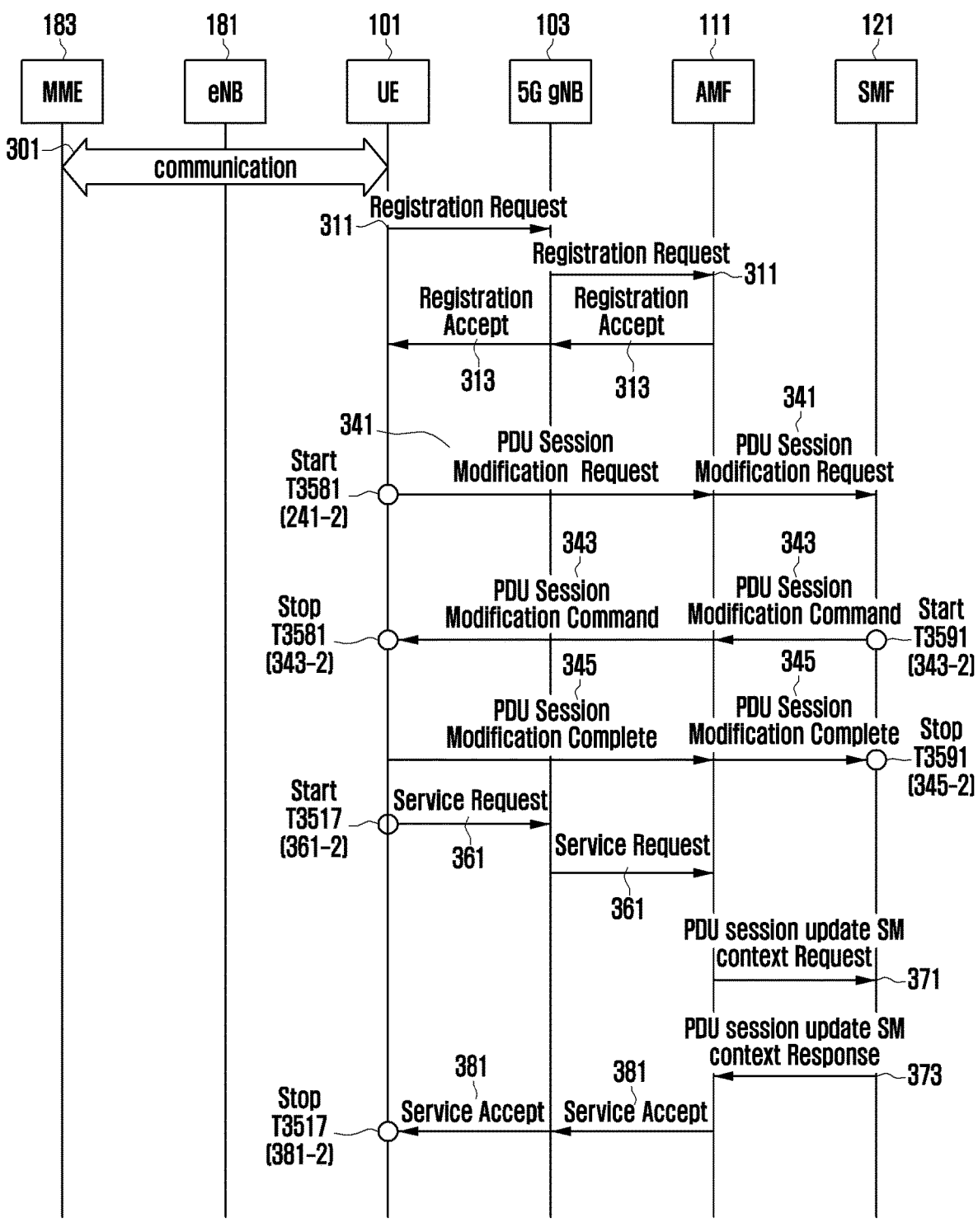
FIG. 3 is a flowchart explaining a procedure for mobility management and session management in a network environment in which 4G and 5G coexist according to an embodiment of the disclosure.

FIG. 3 is a flowchart explaining a procedure for mobility management and session management in a network environment in which 4G and 5G coexist according to an embodiment of the disclosure.

In step 301, the UE 101 may be in a state where it performs communication on the 4G LTE by utilizing the eNB 181 and the MME 183. While performing data communication, the UE 101 may move to the 5G in a handover or idle mode state. That is, while performing data download through a FTP, communication reception, or data transmission, the UE 101 may move to the 5G in the handover or idle mode state.

In step 311, the UE 101 may transmit a registration request message to the AMF 111 through the gNB 103.

In step 313, the AMF 111 having received the registration request message from the UE 101 may transmit a registration accept message to the UE 101.

Thereafter, in step 341, the UE 101 may transmit the PDU session modification message to the SMF 121 through the AMF 111. That is, the UE 101 may include the PDU session modification request message in an UL NAS transport message, and may transmit the PDU session modification request message to the SMF 121 through the AMF 111. That is, the UL NAS transport message, being transmitted to a UE-AMF section, may include, in its payload, the PDU session modification request message, being transmitted to a UE-SMF section. Accordingly, in step 341-2, the UE 101 may start the timer T3581 that is a timer managing the PDU session modification request message.

Thereafter, in step 343, the SMF 121 may transmit the PDU session modification command message to the UE 101 through the AMF 111. The PDU session modification command message may be included in the DL NAS transport message, and may be transmitted from the AMF 111 to the UE 101.

In step 343-2, the SMF 121 may set the timer T3591 while transmitting the PDU session modification command message.

In step 343-3, the UE 101 having received the PDU session modification request message from the SMF 121 may stop the timer T3581 set in the step 341-2.

Further, in step 345, the UE 101 may transmit the PDU session modification complete message to the SMF 121. In step 345-2, the SMF 121 may stop the timer T3591 in case of receiving the PDU session modification complete message that is a response message to the PDU session modification command message from the UE 101.

In step 361, the UE 101 may transmit the service request message to the AMF 111 through the gNB 103. In this case, as shown in step 361-2, the UE 101 may start the timer T3517 while transmitting the service request message.

The service request message in the step 361 is related to connection management, the PDU session modification request message in the step 341 is related to session management, and is carried on the UL NAS transport message going to the AMF 111.

In this case, the following embodiments are possible in relation to the operations of the UE, the AMF, and the SMF.

First, from the position of the UE 101, the following embodiments are possible.

Case 4-1) As an embodiment of the UE 101, from the position of the UE 101, a case may occur, where the PDU session modification transmission is performed earlier than the service request message in the step 361, as shown in FIG. 3.

Case 4-2) As another embodiment of the UE 101, from the position of the UE 101, it is possible to concurrently transmit the PDU session modification in the step 341 and the service request message in the step 361.

Case 4-3) As still another embodiment of the UE 101, from the position of the UE 101, it is possible to start the session management timer T3581 and then to start the connection management timer T3517 before the T3581 is stopped. However, in case that the session management timer T3581 starts, and then the connection management timer T3517 starts before the T3581 is stopped, a case occurs, where processing of the service request message in the network is delayed, and the T3517 expires. If the T3517 expires, the procedure is aborted.

Next, from the position of the AMF 111 in the position of the network, the following embodiments are possible.

Case 5-1) As an embodiment of the AMF 111, in case that the AMF 111 receives a PDU session modification command message from the SMF 121 and transmits the message to the UE 101 as in the step 343 in relation to the PDU session modification, the AMF 111 may transmit the PDU session update SM context request message in the step 371, being related to the received service request message as in the step 361, to the SMF 121 after finishing the step 345, that is, after receiving the PDU session modification complete message, even if the service request message is received from the UE 101 in the middle as in the step 361, before receiving the PDU session modification complete message that is a response message from the UE 101 and transmits the message to the SMF 121.

Case 5-2) As another embodiment of the AMF 111, in case that the service request message in the step 361 is received before the PDU session modification complete message that is a response to the PDU session modification message in the step 343 is received, the AMF 111 may discard the service request message.

Case 5-3) As still another embodiment of the AMF 111, in case that the service request message in the step 361 is received before the PDU session modification complete message that is a response to the PDU session modification message in the step 343 is received, the AMF 111 may transmit, to the UE 101, a service reject message including cause #xx for notifying that the PDU session update SM context request message has failed to be transmitted, routed, or forwarded, which is the subsequent procedure for the service request message, due to the reason of performing of the session management message or the PDU session modification request message, for the UE 101 to currently perform the service request message, or performing of the PDU session establishment. Through this, the UE 101 may be able to retransmit the service request message thereafter.

Further, from the different position of the network, that is, from the position of the SMF 121, the following embodiments are possible.

Case 6-1) As an embodiment of the SMF 121, if the timer T3591 is running in case that the SMF 121 transmits the PDU session modification command message to the UE 101 in the step 343, the timer T3591 keeps running until the PDU session modification complete message that is a response message is received from the UE 101.

Accordingly, the SMF 121 is unable to receive the PDU session update SM context request message from the AMF 111 as in the step 371 before the timer T3591 is stopped. That is, even if there is the service request message from the UE 101 to the AMF 111, the SMF 121 is unable to receive the PDU session update SM context request message from the AMF 111 as in the step 371.

On the other hand, if the service request message is received from the UE 101, the AMF 111 transmits the PDU session update SM context request message to the SMF 121 as in the step 371. Thereafter, the AMF 111 may receive the PDU session update SM context response message from the SMF 121 in the step 373.

In step 381, the AMF 111 may transmit a service accept message to the UE 101 through the gNB 103.

Thereafter, if the service accept message is received in step 381-2, the UE 101 may stop the timer T3517.

Figure 4:
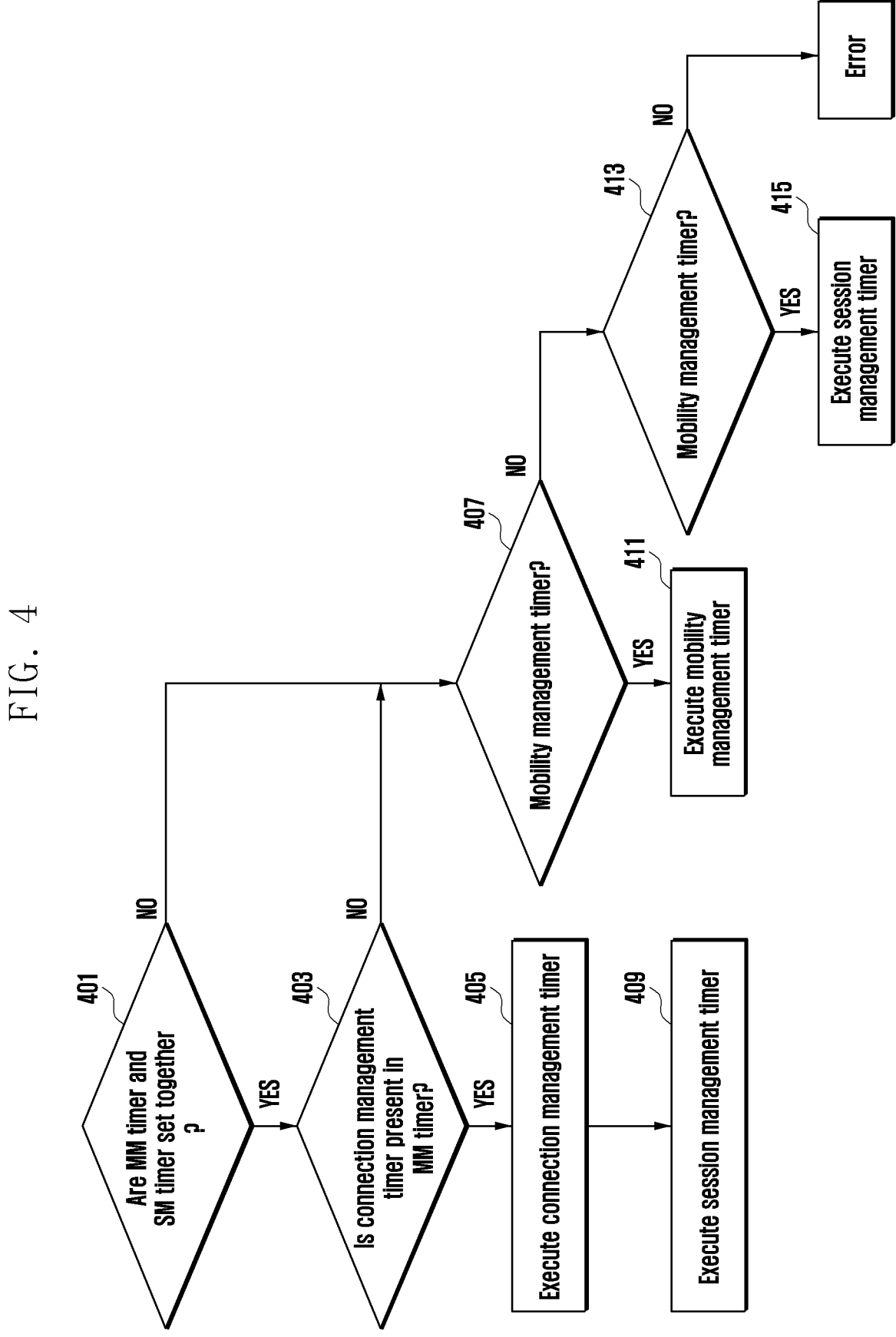
FIG. 4 is a flowchart explaining a procedure for mobility management and session management in a network environment in which 4G and 5G coexist according to an embodiment of the disclosure.

FIG. 4 is a flowchart explaining a procedure for mobility management and session management in a network environment in which 4G and 5G coexist according to an embodiment of the disclosure.

In particular, FIG. 4 is related to how the UE 101 controls the mobility management, the session management, and the connectivity management.

In step 401, the UE 101 may confirm (or check or inspect or identify) whether a mobility management (MM) timer and a session management (SM) timer are set together.

If the MM timer and the SM timer are set together in the step 401, the UE 101 may proceed with step 403, and may confirm (or identify) whether a connection management timer is set or whether the connection management timer exists in the MM timer.

If the connection management timer is set as the result of checking in the step 403, the UE 101 may execute the connection management timer in step 405.

After performing the connection management timer in the step 405, the UE 101 may proceed with step 409, and may execute the session management timer.

If the connection management timer is not set as the result of checking in the step 403, the UE 101 may proceed with step 407, and may identify (determine) whether the mobility management timer is set.

Further, if the MM timer and the SM timer are not set together in the step 401, the UE 101 may proceed with the step 407, and may identify (confirm) whether the timer is the MM timer. If the timer is determined as the mobility management timer in the step 407, the UE 101 may proceed with step 411, and may execute and set the mobility management timer. If the timer is not the mobility management timer through identification (determination) of whether the timer is the mobility management timer, the UE 101 may proceed with step 415.

Further, if it is identified (determined) that the timer is the session management timer in the step 413, the UE 101 may execute the session management timer in step 415.

Further, if it is identified (determined) that the timer is not the session management timer in the step 413, the UE 101 may perform an error process.

Figure 5:
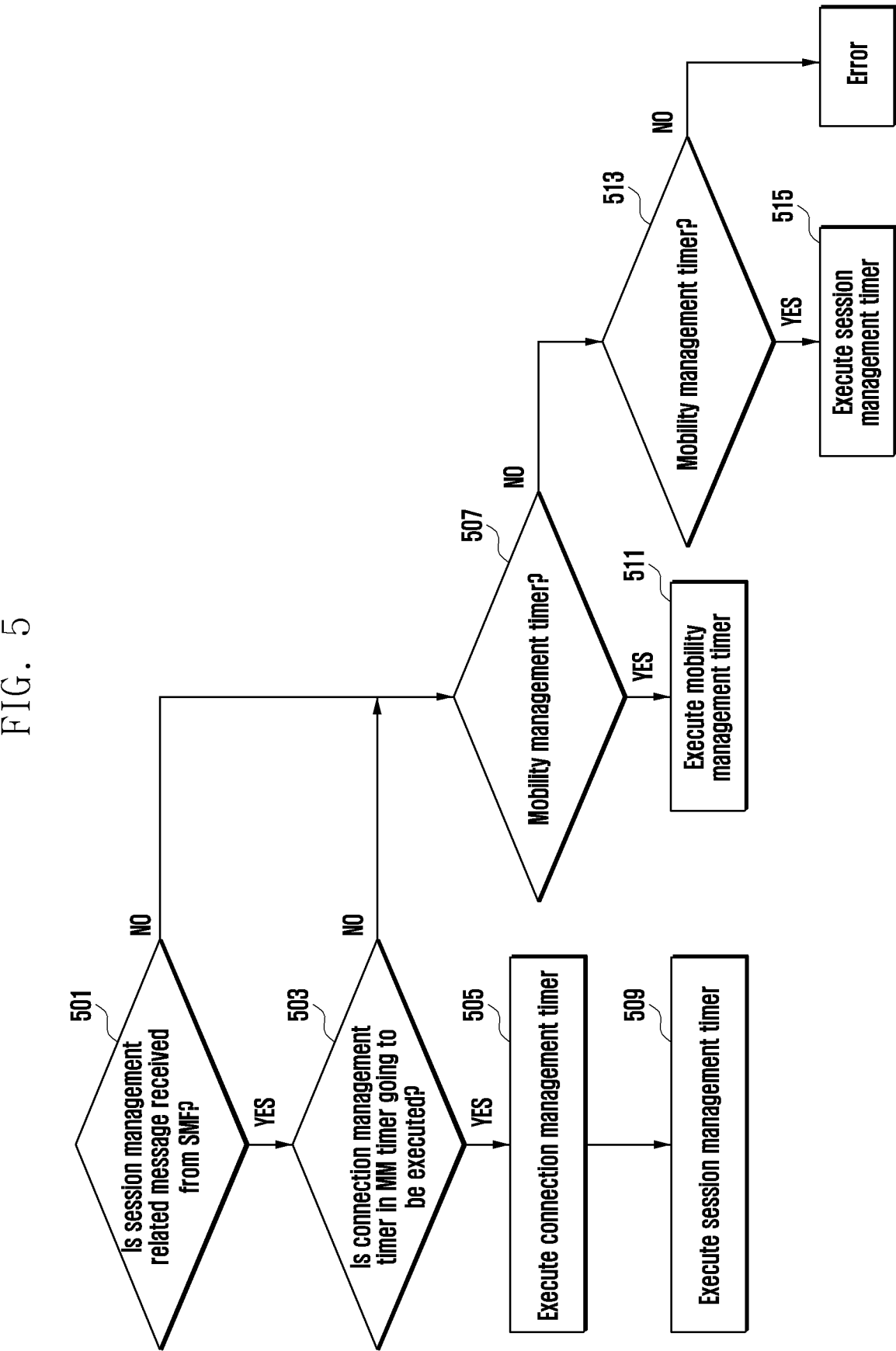
FIG. 5 is a flowchart explaining a procedure for mobility management and session management in a network environment in which 4G and 5G coexist according to an embodiment of the disclosure.

FIG. 5 is a flowchart explaining a procedure for mobility management and session management in a network environment in which 4G and 5G coexist according to an embodiment of the disclosure.

In particular, FIG. 5 is related to how the AMF 111 controls the mobility management, the session management, and the connectivity management.

In step 501, the AMF 111 may confirm (or identify, determine, or inspect) whether a session management related message is received from the SMF 121.

If the session management related message is received from the SMF 121 in the step 501, the AMF 111 may proceed with step 503.

If the session management related message is not received from the SMF 121 in the step 501, the AMF 111 may proceed with step 507.

In the step 503, the AMF 111 may confirm whether the connection management timer is set or whether the connection management timer exists in the MM timer.

If the connection management timer is set in the step 503, the AMF 111 may proceed with step 505, and may execute the connection management timer.

After performing the connection management timer in the step 505, the AMF 111 may proceed with step 509, and may execute the session management timer.

On the other hand, if the connection management timer is not set in the step 503, the AMF 111 may proceed with step 507, and may determine (identify, confirm, or inspect) whether the mobility management timer is set. If the session management related message is not received from the SMF 121 in the step 501, the AMF may proceed with the step 507, and may confirm (identify or inspect) whether the timer is the mobility management timer. If the timer is determined (confirmed, identified, or inspected) as the mobility management timer in the step 507, the AMF 111 may proceed with step 511. If proceeding with the step 511, the AMF 111 may execute (or set) the mobility management timer. Further, if the timer is not the mobility management timer through determination of whether the timer is the mobility management timer in the step 507, the AMF 111 may proceed with step 513.

If it is determined that the timer is the session management timer in the step 513, the AMF 111 may execute the session management timer in step 515. In contrast, if it is determined that the timer is not the session management timer in the step 513, the AMF 111 may perform an error process.

Figure 6:
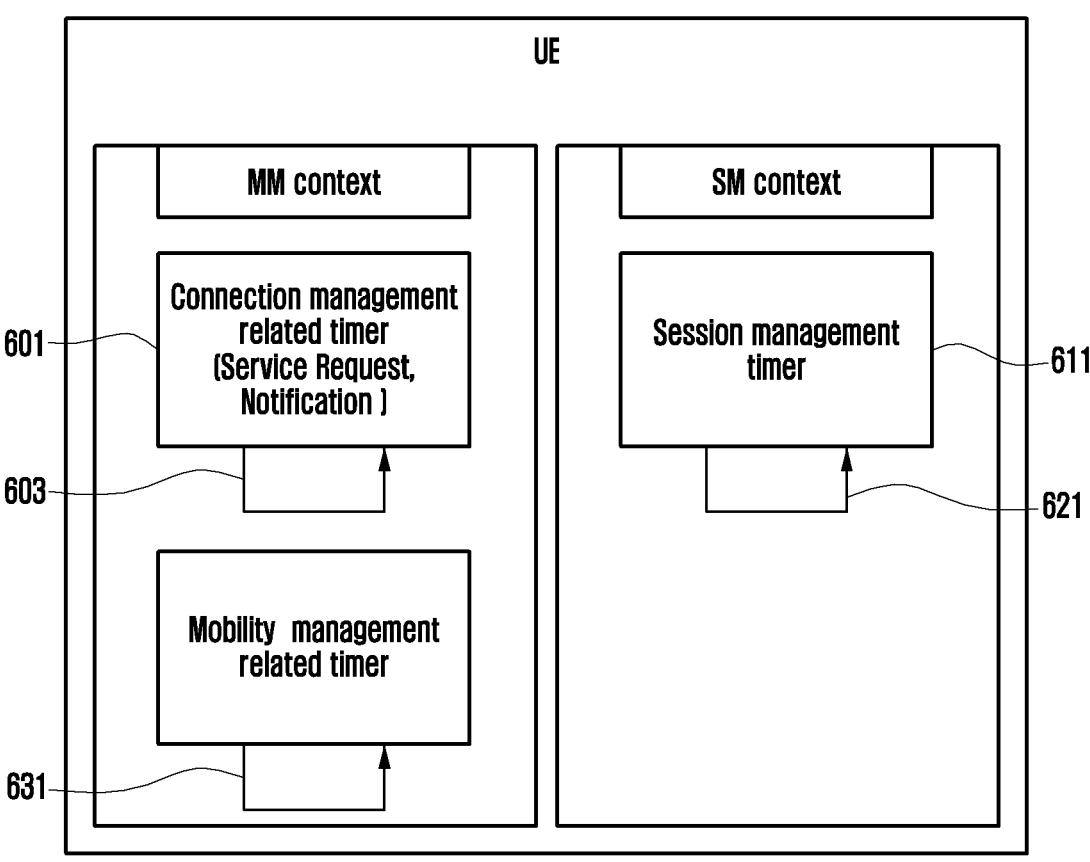
FIG. 6 is a diagram illustrating the constitution of a UE according to an embodiment of the disclosure.

FIG. 6 is a diagram illustrating the constitution of a UE according to an embodiment of the disclosure.

The constitution in FIG. 6 exemplifies only objects that perform the operation according to the disclosure. As described above, such objects may be objects for performing operations corresponding to layer 2 or layer 3. The constitution of a general UE will be described in detail with reference to FIG. 8 to be described later.

The UE 101 separately manages an MM context that is a mobility management context and an SM context that is a session management context. As exemplified by a reference numeral 601, if a connection management timer, for example, a service request related timer or a notification related timer is set, the UE 101 first execute such a connection timer. That is, if the connection management timer and the session management timer exist, the UE 101 first executes the connection management timer as denoted by the reference numeral 601, and then executes the session management timer as exemplified by a reference numeral 603. The connection management timer denoted by a reference numeral 603 may be executed according to its start or stop condition. Such start or stop conditions may be the conditions described in the embodiments of FIGS. 2 and/or 3 as described above.

Further, the mobility management timer denoted by a reference numeral 631 may be executed according to its start or stop condition. In the same manner, the session management timer denoted by a reference numeral 621 may be executed according to its start or stop condition. The start or stop conditions of the timers as described above may be the conditions described in the embodiments of FIGS. 2 and/or 3 as described above.

FIG. 7 is a diagram illustrating the constitution of a network entity according to an embodiment of the disclosure.

In particular, FIG. 7 exemplifies the constitutions of the AMF 111 and the SMF 121 among the network entities, and it is to be noted that only constituent elements related to timers for transmitting/receiving signals of layer 3 for the operations as described above in FIGS. 2 and 3 are exemplified. The constitutions of the AMF 111 and the SMF 121 have been briefly described in FIG. 1, and constitutions of different forms will be further described with reference to FIG. 9 to be described later.

With reference to FIG. 7, in the network, an MM context that is a mobility management context and an SM context that is a session management context are separately managed by the AMF 111 and the SMF 121 as exemplified in FIG. 7.

The reference numeral 701 denotes a connection management timer included in the AMF 111, for example, a timer related to a service request message or a timer related to a notification message, and if such timers are set, the AMF 111 first executes the connection timer. Accordingly, while the connection management timer is running, the AMF 111 does not forward a session management related message to the UE 101. That is, the AMF 111 first executes the connection management timer, and then forwards or processes the session management related message.

Further, the connection management timer denoted by a reference numeral 703 may be executed according to its start or stop condition. Such start or stop conditions of the timer may be the conditions described in FIGS. 2 and 3 as described above.

The reference numeral 711 denotes the session management timer included in the SMF 121, and the SMF 121 may set the session management timer. The session management timer may be a time that is set when the SMF 121 transmits the session management message to the UE 101. The reference numeral 713 exemplifies a case where the SMF 121 transmits the session management message to the UE 101 through the AMF 111.

The mobility management timer denoted by the reference numeral 731, being included in the AMF 111, may be executed according to its start or stop condition.

Further, the session management timer denoted by the reference numeral 721 may be executed according to its start or stop condition.

Figure 8:
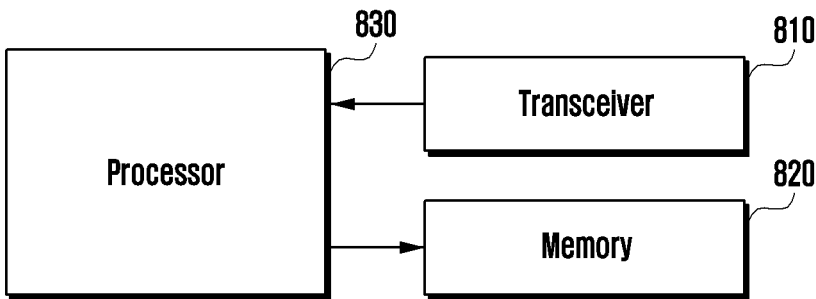
FIG. 8 is a diagram illustrating the constitution of a UE according to an embodiment of the disclosure.

FIG. 8 is a diagram illustrating the constitution of user equipment according to an embodiment of the disclosure.

As exemplified in FIG. 8, user equipment according to the disclosure may include a transceiver 810, a memory 820, and a processor 830.

The transceiver 810 commonly calls a receiver and a transmitter of the UE 101, and may communicate with a base station 103 of a 5G network and/or a base station 181 of a 4G network by using a prescribed wireless interface. Further, the transceiver 810 may communicate with a non-3GPP network, for example, a network such as Wi-Fi, through a prescribed wireless communication interface. Accordingly, the transceiver 810 may include a wireless processing unit for processing wireless signal and a modem. The wireless processing unit may include, for example, an RF transmitter up-converting the frequency of a transmitted signal and a power amplifier amplifying the transmitted signal, and may include an A/D converter converting an analog signal into a digital signal and a D/A converter converting a digital signal into an analog signal. Further, the wireless processing unit may include a low-noise amplifier low-noise-amplifying the received signal. In addition, the transceiver 810 may further include a constitution for receiving a terrestrial broadcasting signal and a constitution for receiving a satellite signal. Further, the transceiver 810 may include a constitution for wired communication. Accordingly, the transceiver 810 may transmit or receive a signal, control information, and/or data to or from the base station. The constitution of the transceiver as described above is merely exemplary, and is not limited thereto. The signal received and processed by the transceiver may be provided to the processor 830 and/or may be stored in the memory 820.

In accordance with the communication method of the UE 101 as described above, the processor 830, the transceiver 810, and the memory 820 of the UE 101 may operate. However, the constituent elements of the UE are not limited to the above-described examples. For example, the UE may include constituent elements that are more than or less than the above-described constituent elements. Further, the processor 830, the transceiver 810, and the memory 820 may be implemented in the form of one chip.

The memory 820 may store programs and data required for the operation of the UE 101. Further, the memory 820 may store control information or data included in the signal obtained from the UE 101. The memory 820 may be composed of storage media, such as a ROM, RAM, hard disk, CD-ROM, and DVD, or combinations of the storage media.

The processor 830 may be composed of only one or two or more application processors for performing the control of an upper layer, and/or may include one or two or more application processors and communication processors. According to circumstances, the communication processor may be included in the transceiver 810. Further, the processor 830 may control the operation of the UE as described above with reference to FIGS. 1 to 7. In particular, the processor 830 may control the operations related to the timers as described above and the operations related to the message transmission and reception.

Figure 9:
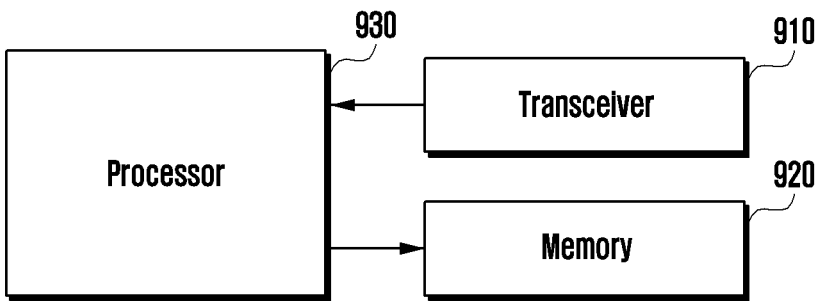
FIG. 9 is a diagram illustrating the constitution of a network entity according to an embodiment of the disclosure.

On the other hand, in FIG. 8, only the constitutions of blocks related to the disclosure exemplified. Accordingly, in case that the UE 101 is a smart phone, it may include various constitutions corresponding to the smart phone, for example, a touchscreen, a stylus pen, keys for user inputs, various kinds of sensors, a battery, and a charging module. As another example, in case that the UE 101 is a tablet computer or a laptop computer, it may further include constitutions corresponding thereto. FIG. 9 is a diagram illustrating the constitution of a network entity according to an embodiment of the disclosure.

As illustrated in FIG. 9, a network entity according to the disclosure may include a transceiver 910, a memory 920, and a processor 930. The constitutions of the network entity, that is, the processor 930, the transceiver 910, and the memory 920 of the network entity may operate according to the above-described communication method of the network entity.

The transceiver 910 may provide various interfaces for transmission and reception of data, signals, and messages with another network entity. For example, in case that the transceiver 910 is included in the AMF 111, it may provide an interface with the gNB 103, an interface with the AUSF 141, an interface with the PCF 161, and an interface with the SMF 121. As another example, in case that the transceiver 910 is included in the SMF 121, it may provide an interface with the UPF 131, an interface with the UDM 141, an interface with the PCF 161, an interface with the MME 183, and an interface with the AMF 111.

The memory 920 may store programs for control as described above with reference to FIGS. 1 to 7, for example, programs and data required for the operation of the network entity, and may store various kinds of control information. Further, the memory 920 may store start and stop conditions of the timers as described above. Further, the memory 920 may store control information or data included in the signal that is obtained from the network entity. The memory 920 may be composed of storage media, such as a ROM, RAM, hard disk, CD-ROM, and DVD, or combinations of the storage media.

The processor 930 may perform necessary operations for the control of each NF. For example, in case that the NF is the AMF 111, the processor 930 may perform the control required for the operation of the AMF 111 as described above with reference to FIGS. 1 to 7, and in case that the NF is the SMF 121, the processor 930 may perform the control required for the operation of the SMF 121 as described above with reference to FIGS. 1 to 7. Further, the processor 930 may control a series of processes so that the network entity as described above can operate according to an embodiment of the disclosure. The processor 930 may include at least one processor. The methods according to embodiments described in claims and the specification of the disclosure may be implemented in the form of hardware, software, or a combination of the hardware and the software.

In case of being implemented by software, a computer readable storage medium that stores one or more programs (software modules) may be provided. One or more programs stored in the computer readable storage medium are configured for execution by one or more processors in an electronic device. The one or more programs include instructions that cause the electronic device to execute the methods according to the claims of the disclosure or embodiments described in the specification.

Such a program (software module or software) may be stored in a nonvolatile memory including a random access memory and a flash memory, a read only memory (ROM), an electrically erasable programmable read only memory (EEPROM), a magnetic disc storage device, a compact disc-ROM (CD-ROM), a digital versatile disc (DVD) or other types of optical storage devices, or a magnetic cassette. Further, the program may be stored in a memory composed of a combination of parts or the whole of them. Further, a plurality of memories may be included.

Further, the program may be stored in an attachable storage device that can be accessed through a communication network such as Internet, Intranet, local area network (LAN), wide LAN (WLAN), or storage area network (SAN) or a communication network composed of a combination thereof. The storage device may be accessed by a device that performs embodiments of the disclosure through an external port. Further, a separate storage device on the communication network may access a device that performs embodiments of the disclosure.

It is to be noted that the NF as described above is not limited to the form exemplified in FIG. 9. That is, the constituent elements of the network entity are not limited to the form exemplified in FIG. 9. For example, the network entity may include constituent elements that are more than or less than the above-described constituent elements. Further, the processor 930, the transceiver 910, and the memory 920 may be implemented in the form of one chip. The network entity may include network functions (NFs), such as the above-described access and mobility management function (AMF), session management function (SMF), policy and charging function (PCF), network exposure function (NEF), unified data management (UDM), and user plane function (UPF). Further, the network entity may include a base station.

The transceiver 910 may be composed of an RF trans- mitter up-converting and amplifying the frequency of a transmitted signal, and an RF receiver low-noise-amplifying the received signal and down-converting the frequency. However, this is merely an embodiment of the transceiver 910, and the constituent elements of the transceiver 910 are not limited to the RF transmitter and the RF receiver. The transceiver 910 may include a wired/wireless transceiver, and may include various constitutions for signal transmission and reception.

In the above-described detailed embodiments of the disclosure, the constituent elements included in the disclosure may be expressed in the singular or plural form depending on the proposed detailed embodiments. However, the singular or plural expression has been selected suitably for a proposed situation for convenience of description, and the disclosure is not limited to the singular or plural constituent elements. Although an element has been expressed in the plural form, it may be configured in the singular form, and although an element has been expressed in the singular form, it may be configured in the plural form.

Figure 10:
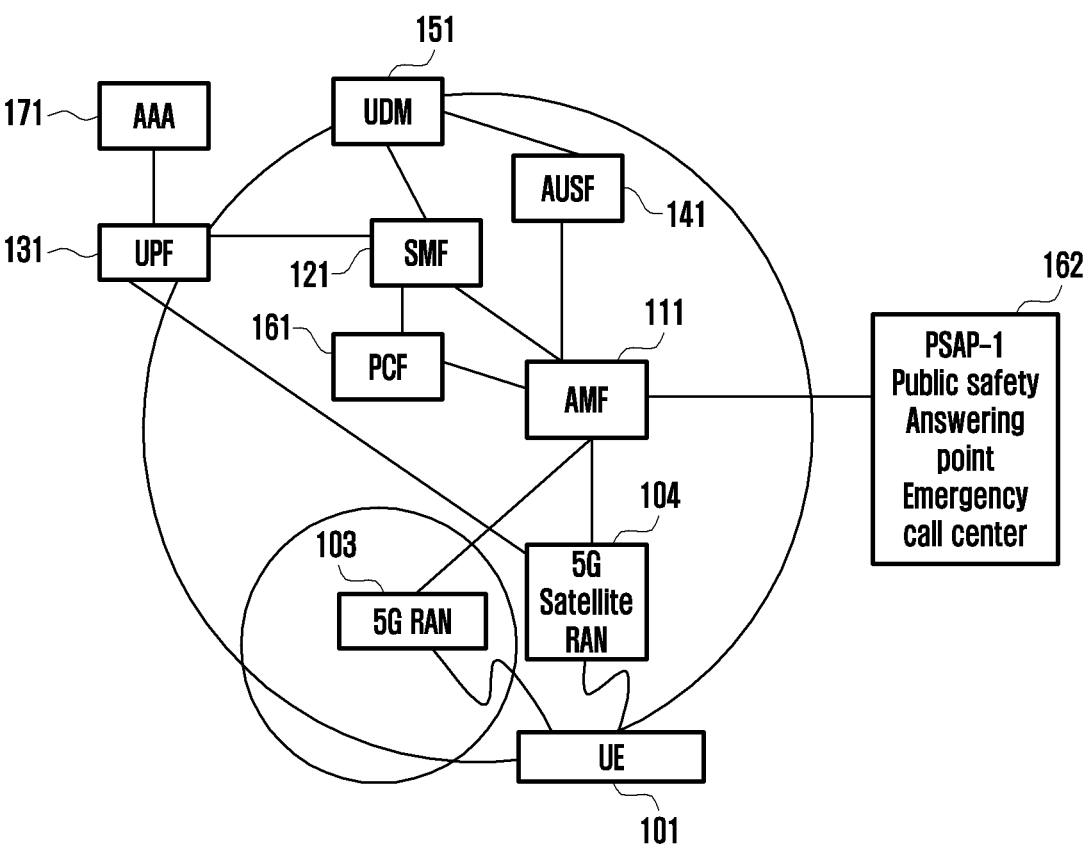
FIG. 10 illustrates a first embodiment of a UE and a network environment for supporting an emergency call in a communication system that supports a 5G wireless communication and an artificial satellite according to an embodiment of the disclosure.

FIG. 10 illustrates a first embodiment of a UE and a network environment for supporting an emergency call in a communication system that supports a 5G wireless communication and an artificial satellite according to an embodiment of the disclosure. That is, FIG. 10 illustrates a first embodiment of a UE and a network environment for performance-improved communication in a 5G network according to an embodiment of the disclosure.

With reference to FIG. 10, a 5G or NR core network may be composed of network functions (NFs), such as a user plane function (UPF) 131, a session management function (SMF) 121, an access and mobility management function (AMF) 111, a 5G radio access network (RAN) 103, a user data management (UDM) 151, and a policy control function (PCF) 161. According to an embodiment of the disclosure, the above-described network function may mean a network entity. Further, for authentication of such entities, the 5G or NR core network may include entities, such as an authentication server function (AUSF) 141, and an authentication, authorization, and accounting (AAA) 171. A user equipment (UE) 101 may access the 5G core network through the base station (5G RAN) 103. According to an embodiment of the disclosure, the UE may mean a terminal, and the 5G RAN may mean a base station. Such a 5G RAN base station may be a typical 5G RAN base station, or may be a 5G satellite RAN base station.

On the other hand, in case that the UE 101 performs communication through a non-3GPP access, an N3IWF (not illustrated in FIG. 10) may exist. Further, in case that the UE performs communication through the non-3GPP access, the session management may be controlled by the UE 101, the non-3GPP access, the N3IWF, or the SMF 121, and the mobility management may be controlled through the UE 101, the non-3GPP access, the N3IWF, or the AMF 111.

In the 5G or NR system, as described above, the entities performing the mobility management and the session management may be separated into the AMF 111 and the SMF

121. On the other hand, in the 5G or NR system, a standalone (SA) deployment structure in which communication is performed only by 5G or NR entities and a non-standalone (NSA) deployment structure in which a 4G entity and 5G or NR entities are used together have been considered.

As illustrated in FIG. 10, in case that the UE 101 communicates with the network, the control may be performed by the eNB, and the deployment in the form in which a 5G entity of the core network is used may be possible. In this case, the mobility management between the UE 101 and the AMF 111 and the session management between the UE 101 and the SMF 121 may be performed by a non-access stratum (NAS) layer that is layer 3. On the other hand, an access stratum (AS) that is layer 2 may be transferred between the UE 101 and the eNB.

Although it is assumed that a communication network on which the disclosure is based is the 5G or 4G LTE network, the same concept may be applied to another system within the scope that those of ordinary skill in the art can understand.

Figure 11:
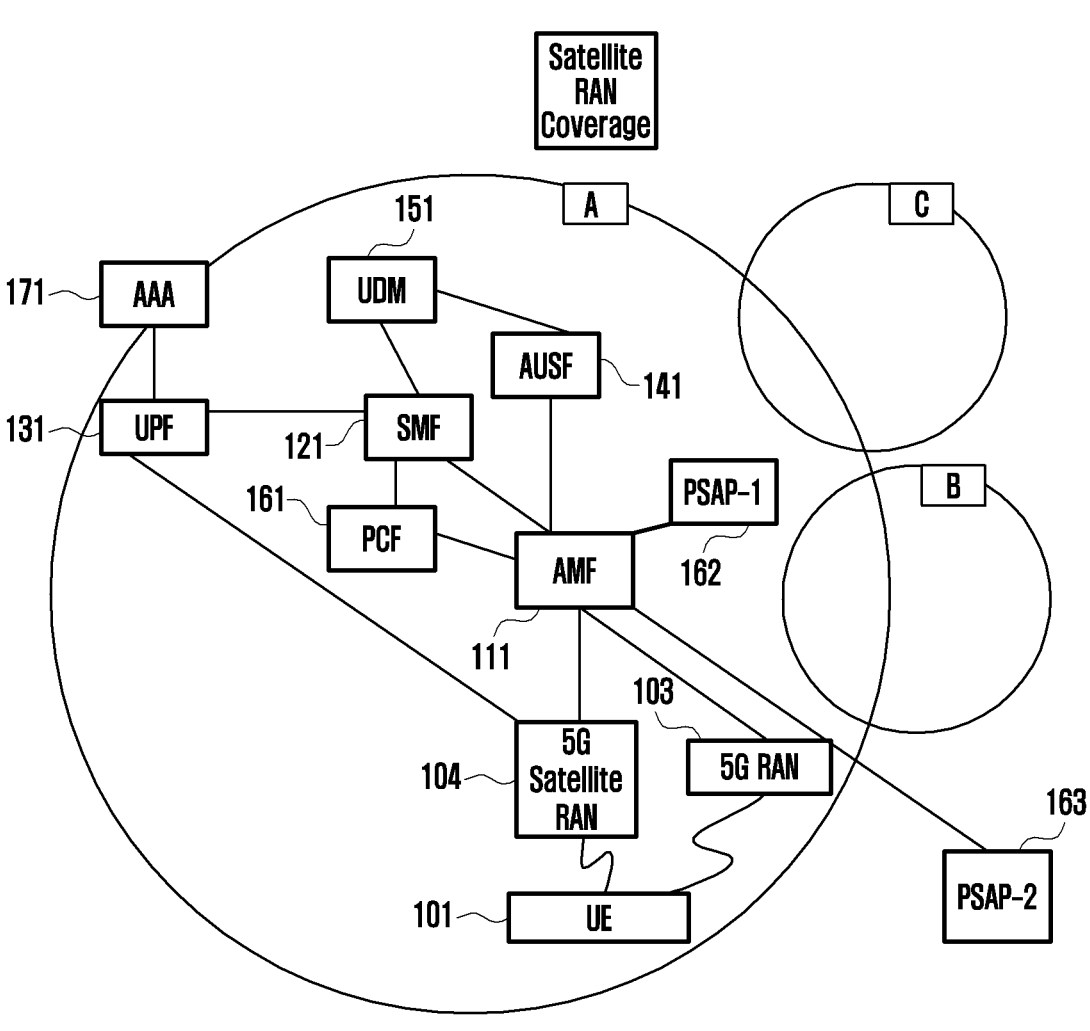
FIG. 11 illustrates a second embodiment of a UE and a network environment for supporting an emergency call in a communication system that supports a 5G wireless communication and an artificial satellite according to an embodiment of the disclosure.

FIG. 11 illustrates a second embodiment of a UE and a network environment for supporting an emergency call in a communication system that supports a 5G wireless communication and an artificial satellite according to an embodiment of the disclosure. With reference to FIGS. 10 and 11, a base station may mean a 5G satellite RAN 104. The base station (5G satellite RAN 104) may be a low earth orbit (LEO), a medium earth orbit (MEO), a geostationary orbit (GEO), or another satellite RAN. In case of the satellite base station, it may mean that the LEO has an altitude of 2000 km or less, the MEO has an altitude between 8000 km to 25000 km, and the GEO has an altitude of 35786 km.

With reference to FIG. 11, in case that the satellite base station is used, a region that is covered by the satellite base station may be wider than a region that is covered by a general base station. That is, the region covered by the satellite NR may be wider than the region covered by the general 5G-NR. According to an embodiment, in FIGS. 10 and 11, the general base station may mean the 5G RAN 103, and the satellite base station may mean the 5G satellite RAN 104. According to an embodiment of the disclosure, the general base station may be called the 5G RAN or RAN. Further, the satellite base station may be called the 5G satellite RAN or satellite RAN. In the disclosure, a UE's communication method using the satellite base station may be called a satellite NR. In the disclosure, an artificial satellite base station or a satellite base station may mean a (5G) satellite RAN.

According to an embodiment, as the region covered by the satellite base station becomes wider, the region covered by the satellite base station may not be limited to the region of one country. For example, in case that several countries are adjacent to one another, the region covered by the satellite base station may include the regions of the several countries.

For example, with reference to FIG. 11, the region covered by the 5G satellite RAN 104 may include regions A, B, and C. As illustrated in FIG. 11, the coverage of the 5G satellite RAN 104 may span several regions and several countries. For example, the satellite RAN coverage of FIG. 11 may include the all regions A, B, and C, or may cover only parts of the regions A, B, and C. Further, the satellite RAN coverage may include a part of any one of the regions A, B, and C, or only any part of the regions A, B, and C.

On the other hand, the satellite NR may be continuously used in an environment in which the base station is unable to be easily installed, like the sea beyond the land area, or even in case that the base station is damaged due to a disaster situation.

Further, in case that the coverage of the base station spans several countries, it may become a problem which country's regulations, rules, and laws are to be followed when the base station performs the communication. Further, in case of the satellite NR, it is more expensive than the general 5G NR communication in terms of cost.

With reference to FIGS. 10 and 11, PSAP-1 162 or PSAP-2 163 may mean a public safety answering point, that is, an emergency call center. In an embodiment illustrated in FIG. 10, the emergency call center, that is, the PSAP-1 162, may mean an emergency call center that belongs to a specific country. Further, in an embodiment illustrated in FIG. 11, the emergency call center may mean an emergency call center that can be utilized among several countries so that communication becomes possible on a ship in the open sea or in the open sea, like the PSAP-2 163.

Figure 12:
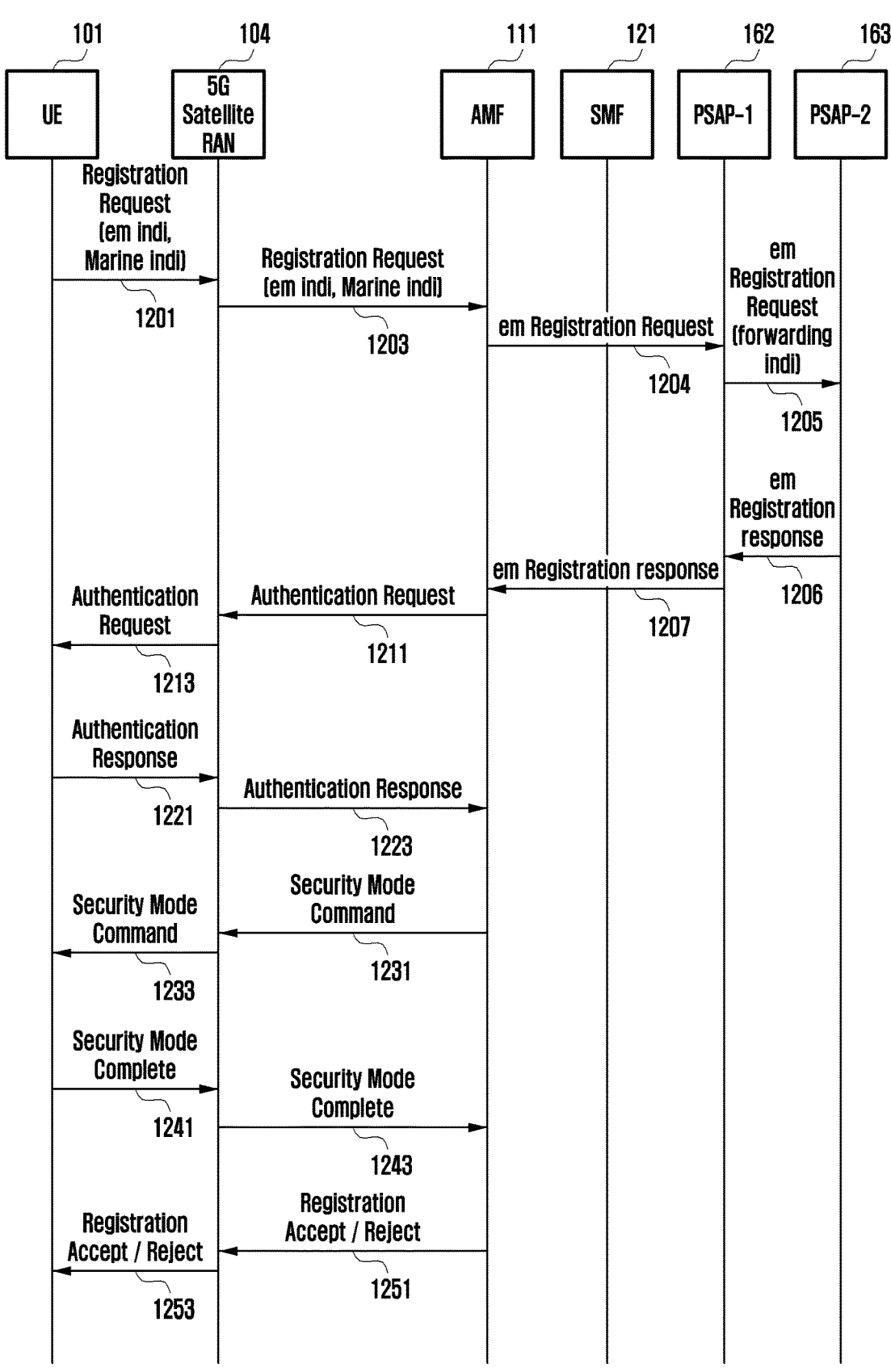
FIG. 12 is a flowchart explaining a procedure for supporting an emergency call in a communication system that supports a 5G wireless communication and an artificial satellite according to an embodiment of the disclosure.

FIG. 12 is a flowchart explaining a procedure for supporting an emergency call in a communication system that supports a 5G wireless communication and an artificial satellite according to an embodiment of the disclosure.

With reference to FIG. 12, in steps 1201 and 1203, the UE 101 may transmit a registration request message to the AMF 111.

Specifically, in the steps 1201 and 1203, the UE 101 may transmit the registration request message to the AMF 111, and the registration request message may be transmitted from the UE 101 to the AMF 111 through the 5G satellite RAN 104.

In this case, in case that the UE 101 is a UE that supports a 5G satellite radio access technology (RAT) type, the UE 101 may transmit security related information that can be supported by the 5G satellite RAT type to the AMF 111.

In an embodiment, the UE 101 may transmit the registration request message to the 5G satellite RAN 104, and the 5G satellite RAN 104 having received the registration request message may transfer or forward the registration request message received from the UE 101 to the AMF 111. According to an embodiment, the 5G satellite RAN 104 may transfer the registration request message received from the UE 101 to the AMF 111 as it is. Further, the 5G satellite RAN 104 may transmit another registration request message to the AMF 111 based on the registration request message received from the UE 101.

According to an embodiment, the registration request message that is transmitted from the UE 101 to the AMF 111 through the 5G satellite RAN 104 in the steps 1201 and 1203 may include information, such as an emergency indication or an emergency marine indication. In an embodiment of FIG. 12, "em indi" may mean the emergency indication, and "Marine indi" may mean the emergency marine indication.

According to an embodiment, the emergency indication or the emergency marine indication may be included in the registration request message to be transmitted in case of attempting an emergency call in a state where the UE 101 is in an emergency situation or in a marine emergency situation in the open sea. That is, in case that the UE is in the emergency situation, the registration request message may include the emergency indication. Further, in case that the UE is in the emergency situation in the sea, and attempts the emergency call, the registration request message may include the emergency marine indication.

Case 1) According to an embodiment, the emergency indication or the marine indication (or emergency marine indication) may mean a separate information element (IE), that is, a parameter. For example, the emergency indication or the emergency marine indication may be represented as the information element or the parameter.

Case 2) According to another embodiment, the emergency indication or the marine indication (or emergency marine indication) may be expressed by a mobile country code (MCC) that represents a specific country. Further, the emergency indication or the marine indication (or emergency marine indication) may be expressed in a separate MCC form and may be transmitted.

According to an embodiment, the marine may not belong to a specific country, may include an area that belongs to no country, or may be shared by two or more countries. Accordingly, in the above-described case, the marine indication may be indicated by taking a code, such as 90x or 9xx and by taking an MCC form that is partial information of a constituent element representing a public land mobile network (PLMN), such as the 90x or 9xx code.

In case that the UE 101 registers in a corresponding region by the regulatory or satellite usage agreement, the UE 101, in the current region, may take a country code (MCC) form of which the usage is allowed in the current location or a partial form of the PLMN including 90x or 9xx code by the regulatory, agreement between countries, or satellite usage agreement. For example, the UE 101 may indicate the emergency indication or the marine indication (or emergency marine indication) by using the country code (MCC) form of which the usage is allowed in the current location or a country code in the location where the UE 101 is currently located, or a code form which does not belong to a specific country (like the sea), but can be used by several countries in an agreement or an emergency situation, or the PLMN type including the 90x code or 9xx code that can be shared and used by several neighboring countries during emergency, or MCC type that is a part of the PLMN.

According to an embodiment of the disclosure, the registration request message may include information of Table 1 below.

TABLE 1

| IEI | Information Element | Type/Reference | Presence |
|---|---|---|---|
| | Extended protocol discriminator | Extended Protocol discriminator | M |
| | Security header type | Security header type | M |
| | Spare half octet | Spare half octet | M |
| | Registration request message identity | Message type | M |
| | 5GS registration type | 5GS registration type | M |
| | ngKSI | NAS key set identifier | M |
| | 5GS mobile identity | 5GS mobile identity | M |
| | Non-current native NAS key set identifier | NAS key set identifier | O |
| | 5GMM capability | 5GMM capability | O |
| | UE security capability | UE security capability | O |
| | Requested NSSAI | NSSAI | O |
| | Last visited registered TAI | 5GS tracking area identity | O |
| | S1 UE network capability | S1 UE network capability | O |
| | Uplink data status | Uplink data status | O |
| | PDU session status | PDU session status | O |
| | MICO indication | MICO indication | O |
| | UE status | UE status | O |
| | Additional GUTI | 5GS mobile identity | O |
| | Allowed PDU session status | Allowed PDU session status | O |
| | UE's usage setting | UE's usage setting | O |
| | Requested DRX parameters | 5GS DRX parameters | O |
| | EPS NAS message container | EPS NAS message container | O |
| | LADN indication | LADN indication | O |
| | Payload container type | Payload container type | O |

TABLE 1-continued

| IEI | Information Element | Type/Reference | Presence |
|---|---|---|---|
| | Payload container | Payload container | O |
| | Network slicing indication | Network slicing indication | O |
| | 5GS update type | 5GS update type | O |
| | Mobile station classmark 2 | Mobile station classmark 2 | O |
| | Supported codecs | Supported codec list | O |
| | NAS message container | NAS message container | O |
| | EPS bearer context status | EPS bearer context status | O |
| | Requested extended DRX parameters | Extended DRX parameters | O |
| | T3324 value | GPRS timer 3 | O |
| | UE radio capability ID | UE radio capability ID | O |
| | Requested mapped NSSAI | Mapped NSSAI | O |
| | Additional information requested | Additional information requested | O |
| | Requested WUS assistance information | WUS assistance information | O |
| | N5GC indication | N5GC indication | O |
| | Requested NB-N1 mode DRX parameters | NB-N1 mode DRX parameters | O |
| | Marine indication | | |
| | Emergency indication | | |

According to an embodiment, in step 1204, the AMF 111 may transmit an emergency registration request message to PSAP-1 162. In FIG. 12, "em Registration Request" may mean the emergency registration request message.

According to an embodiment, in step 1205, the PSAP-1 162 may forward the emergency registration request message to PSAP-2 163. In this case, the emergency registration request message may include a forwarding indication. Although an emergency call is set to access a near PSAP or emergency center, the forwarding indication may be used to notify that the corresponding call has been forwarded in a marine situation, in case that the UE accesses by using the satellite base station because the general base station is unavailable, or in case that the emergency call is a call that is unable to be accommodated by the PSAP. In FIG. 12, "forwarding indi" may mean the forwarding indication.

According to an embodiment, in step 1206, the PSAP-2 163 may transmit an emergency registration response message to the PSAP-1 162. In FIG. 12, "em Registration response" may mean the emergency registration response message.

According to an embodiment, in step 1207, the PSAP-1 162 may transmit the emergency registration response message to the AMF 111.

According to an embodiment, in steps 1211 and 1213, the AMF 111 may transmit an authentication request message to the UE 101. That is, in the steps 1211 and 1213, the AMF 111 may transmit the authentication request message to the UE 101. Specifically, in the step 1211, the AMF 111 may transmit the authentication request message to the 5G satellite RAN 104. Further, in the step 1213, the 5G satellite RAN 104 may transmit the authentication request message to the UE 101.

According to an embodiment, in steps 1221 and 1223, the UE 101 may transmit an authentication response message to the AMF 111. That is, in the steps 1221 and 1223, the UE 101 may transmit the authentication response message to the AMF 111. Specifically, in the step 1221, the UE 101 may transmit the authentication response message to the 5G satellite RAN 104. Further, in the step 1223, the 5G satellite RAN 104 may transmit the authentication response message to the AMF 111.

According to an embodiment, in steps 1231 and 1233, the AMF 111 may transmit a security mode command message to the UE 101. That is, in the steps 1231 and 1233, the AMF

111 may transmit the security mode command message to the UE 101 through the 5G satellite RAN 104. Specifically, in the step 1231, the AMF 111 may transmit the security mode command message to the 5G satellite RAN 104. Further, in the step 1233, the 5G satellite RAN 104 may transmit the security mode command message to the UE 101.

According to an embodiment, in steps 1241 and 1243, the UE 101 may transmit a security mode complete message to the AMF 111. That is, in the steps 1241 and 1243, the UE 101 may transmit the security mode complete message to the AMF 111. Specifically, in the step 1241, the UE 101 may transmit the security mode complete message to the 5G satellite RAN 104. Further, in the step 1243, the 5G satellite RAN 104 may transmit the security mode complete message to the AMF 111.

According to an embodiment, in the steps 1251 and 1253, the AMF 111 may transmit a registration response message to the UE 101.

According to an embodiment, in the steps 1251 and 1253, the AMF 111 may transmit a registration accept or registration reject message to the UE 101. According to an embodiment, the registration accept or registration reject message may be transmitted from the AMF 111 to the UE 101 through the 5G satellite RAN 104.

According to an embodiment, in the steps 1251 and 1253, the registration response message that is transmitted from the AMF to the UE 101 through the 5G satellite RAN 104 may include the registration accept message or the registration reject message.

Figure 13:
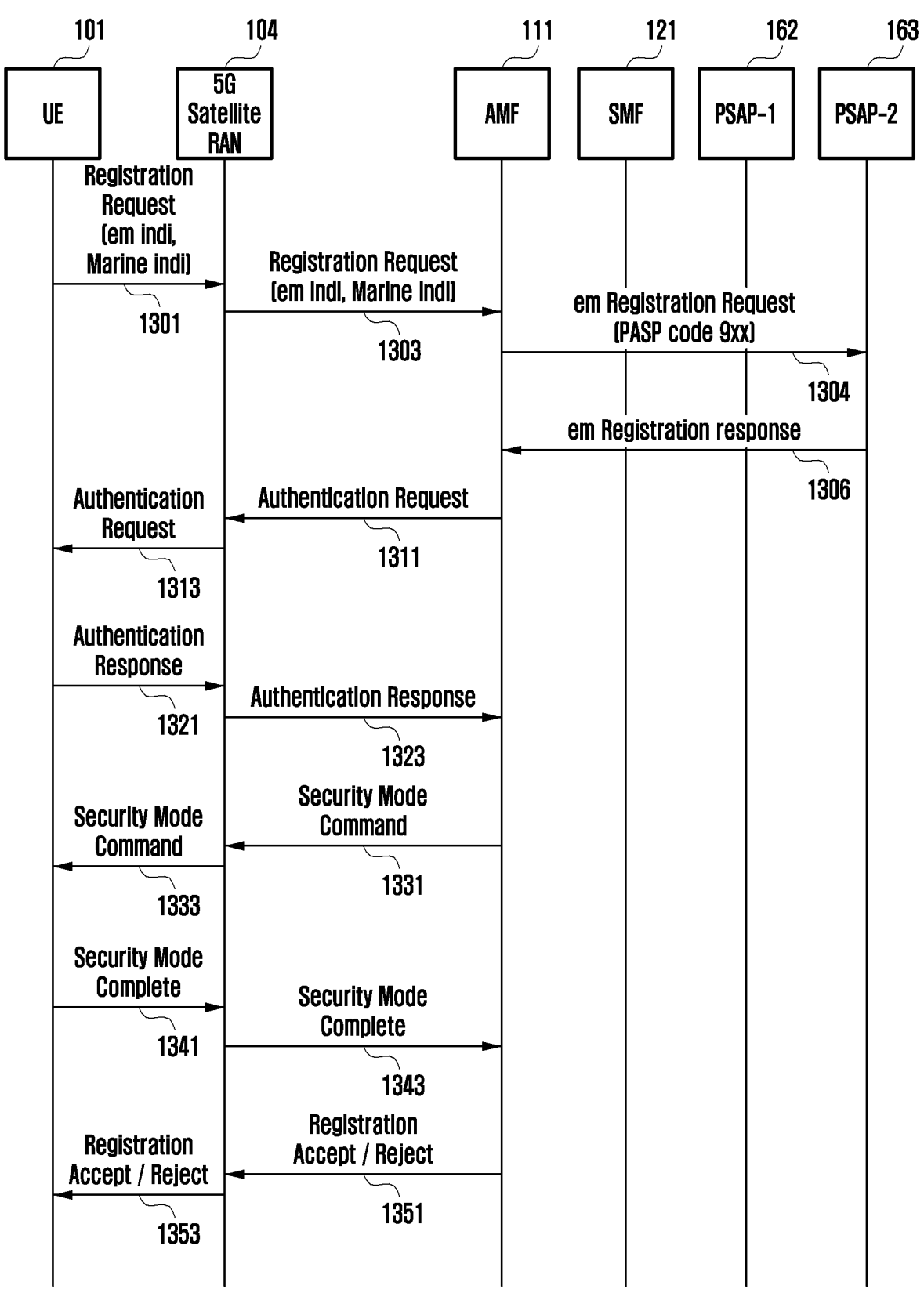
FIG. 13 is a flowchart explaining a procedure for supporting an emergency call in a communication system that supports a 5G wireless communication and an artificial satellite according to an embodiment of the disclosure.

FIG. 13 is a flowchart explaining a procedure for supporting an emergency call in a communication system that supports a 5G wireless communication and an artificial satellite according to an embodiment of the disclosure.

With reference to FIG. 13, in steps 1301 and 1303, the UE 101 may transmit a registration request message to the AMF 111.

Specifically, in the steps 1301 and 1303, the UE 101 may transmit the registration request message to the AMF 111, and the registration request message may be transmitted from the UE 101 to the AMF 111 through the 5G satellite RAN 104.

In this case, in case that the UE 101 is a UE that supports a 5G satellite radio access technology (RAT) type, the UE 101 may transmit security related information that can be supported by the 5G satellite RAT type to the AMF 111.

In an embodiment, the UE 101 may transmit the registration request message to the 5G satellite RAN 104, and the 5G satellite RAN 104 having received the registration request message may transfer or forward the registration request message received from the UE 101 to the AMF 111. According to an embodiment, the 5G satellite RAN 104 may transfer the registration request message received from the UE 101 to the AMF 111 as it is. Further, the 5G satellite RAN 104 may transmit another registration request message to the AMF 111 based on the registration request message received from the UE 101.

According to an embodiment, the registration request message that is transmitted from the UE 101 to the AMF 111 through the 5G satellite RAN 104 in the steps 1301 and 1303 may include information, such as an emergency indication or an emergency marine indication. In an embodiment of FIG. 13, "em indi" may mean the emergency indication, and "Marine indi" may mean the emergency marine indication.

According to an embodiment, the emergency indication or the emergency marine indication may be included in the registration request message to be transmitted in case of attempting an emergency call in a state where the UE 101 is in an emergency situation or in a marine emergency situation in the open sea. That is, in case that the UE is in the emergency situation, the registration request message may include the emergency indication. Further, in case that the UE is in the emergency situation in the sea, and attempts the emergency call, the registration request message may include the emergency marine indication.

Case 1) According to an embodiment, the emergency indication or the marine indication (or emergency marine indication) may mean a separate information element (IE), that is, a parameter. For example, the emergency indication or the emergency marine indication may be represented as the information element or the parameter.

Case 2) According to another embodiment, the emergency indication or the marine indication (or emergency marine indication) may be expressed by an MCC that represents a specific country (in the location where the UE 101 currently belongs). Further, the emergency indication or the marine indication (or emergency marine indication) may be expressed in a separate MCC form and may be transmitted.

According to an embodiment, the marine may not belong to a specific country, may include an area that belongs to no country, or may be shared by two or more countries.

Accordingly, in the above-described case, the marine indication may be indicated by taking a code, such as 90x or 9xx and by taking an MCC form that is partial information of a constituent element representing a PLMN, such as the 90x or 9xx code.

In case that the UE 101 registers in a corresponding region by the regulatory or satellite usage agreement, the UE 101, in the current location, may take a country code (MCC) form of which the usage is allowed in the current location or a partial form of the PLMN including 90x or 9xx code by the regulatory, agreement between countries, or satellite usage agreement. For example, the UE 101 may indicate the emergency indication or the marine indication (or emergency marine indication) by using the MCC form of which the usage is allowed in the current location or a country code in the location where the UE is currently located, or a code form which does not belong to a specific country (like the sea), but can be used by several countries in an agreement or an emergency situation, or the PLMN type including the 90x code or 9xx code that can be shared and used by several neighboring countries during emergency, or MCC type that is a part of the PLMN.

According to an embodiment of the disclosure, the registration request message may include information of Table 2 below.

TABLE 2

| IEI | Information Element | Type/Reference | Presence |
|---|---|---|---|
| | Extended protocol discriminator | Extended Protocol discriminator | M |
| | Security header type | Security header type | M |
| | Spare half octet | Spare half octet | M |
| | Registration request message identity | Message type | M |
| | 5GS registration type | 5GS registration type | M |
| | ngKSI | NAS key set identifier | M |
| | 5GS mobile identity | 5GS mobile identity | M |
| | Non-current native NAS key set identifier | NAS key set identifier | O |
| | 5GMM capability | 5GMM capability | O |
| | UE security capability | UE security capability | O |

TABLE 2-continued

| IEI | Information Element | Type/Reference | Presence |
|---|---|---|---|
| | Requested NSSAI | NSSAI | O |
| | Last visited registered TAI | 5GS tracking area identity | O |
| | S1 UE network capability | S1 UE network capability | O |
| | Uplink data status | Uplink data status | O |
| | PDU session status | PDU session status | O |
| | MICO indication | MICO indication | O |
| | UE status | UE status | O |
| | Additional GUTI | 5GS mobile identity | O |
| | Allowed PDU session status | Allowed PDU session status | O |
| | UE's usage setting | UE's usage setting | O |
| | Requested DRX parameters | 5GS DRX parameters | O |
| | EPS NAS message container | EPS NAS message container | O |
| | LADN indication | LADN indication | O |
| | Payload container type | Payload container type | O |
| | Payload container | Payload container | O |
| | Network slicing indication | Network slicing indication | O |
| | 5GS update type | 5GS update type | O |
| | Mobile station classmark 2 | Mobile station classmark 2 | O |
| | Supported codecs | Supported codec list | O |
| | NAS message container | NAS message container | O |
| | EPS bearer context status | EPS bearer context status | O |
| | Requested extended DRX parameters | Extended DRX parameters | O |
| | T3324 value | GPRS timer 3 | O |
| | UE radio capability ID | UE radio capability ID | O |
| | Requested mapped NSSAI | Mapped NSSAI | O |
| | Additional information requested | Additional information requested | O |
| | Requested WUS assistance information | WUS assistance information | O |
| | N5GC indication | N5GC indication | O |
| | Requested NB-N1 mode DRX parameters | NB-N1 mode DRX parameters | O |
| | Marine indication | | |
| | Emergency indication | | |

According to an embodiment, in step 1304, the AMF 111 may transmit an emergency registration request message to PSAP-2 163. In FIG. 12, "em Registration Request" may mean the emergency registration request message. According to an embodiment, the emergency registration request message may include a PSAP code. For example, in the step 1304, the emergency registration request message that is transmitted from the AMF 111 to the PSAP-2 163 may include the PSAP code 9xx.

According to an embodiment, an emergency call may be set to access a near PSAP or an emergency center. However, in a marine situation, or in case that the UE accesses by using the satellite base station because the general base station is unavailable, or in case that the emergency call is a call that is unable to be accommodated by the PSAP, the corresponding call may be directly connected to the PSAP that can process the marine situation.

As described above, the case that the corresponding call is directly connected to the PSAP that can process the marine situation may mean the case that the AMF 111 watches the registration request message received from the UE 101, and if the MCC is the marine or the marine indication exists, the AMF 111 transmits an emergency registration request to the PSAP that can handle the emergency call in the marine situation.

Accordingly, in case of the emergency registration request message, the marine indication may be indicated to include a code, such as 90x or 9xx in the MCC form of PLMN information, such as a 90x or 9xx code, and the emergency registration request message may include such marine indication related information.

In case that the UE registers in a corresponding region by the regulatory or satellite usage agreement, the UE 101, in the current region, may take a country code (MCC) of which the usage is allowed in the current location or a form of the PLMN including the 90x code or 9xx code by the regulatory, agreement between countries, or satellite usage agreement. For example, the UE may indicate the emergency indication or the marine indication (or emergency marine indication) by using the PLMN form including a country code (MMC) of which the usage is allowed in the current location or 90x code or 9xx code, or the MCC form of the PLMN type composed of the 90x code or 9xx code.

According to an embodiment, in step 1306, the PSAP-2 163 may transmit an emergency registration response message to the AMF 111. In FIG. 13, "em Registration response" may mean the emergency registration response message.

According to an embodiment, in steps 1311 and 1313, the AMF 111 may transmit an authentication request message to the UE 101. That is, in the steps 1311 and 1313, the AMF 111 may transmit the authentication request message to the UE 101. Specifically, in the step 1311, the AMF 111 may transmit the authentication request message to the 5G satellite RAN 104. Further, in the step 1313, the 5G satellite RAN 104 may transmit the authentication request message to the UE 101.

According to an embodiment, in steps 1321 and 1323, the UE 101 may transmit an authentication response message to the AMF 111. That is, in the steps 1321 and 1323, the UE 101 may transmit the authentication response message to the AMF 111. Specifically, in the step 1321, the UE 101 may transmit the authentication response message to the 5G satellite RAN 104. Further, in the step 1323, the 5G satellite RAN 104 may transmit the authentication response message to the AMF 111.

According to an embodiment, in steps 1331 and 1333, the AMF 111 may transmit a security mode command message to the UE 101. That is, in the steps 1331 and 1333, the AMF 111 may transmit the security mode command message to the UE 101 through the 5G satellite RAN 104. Specifically, in the step 1331, the AMF 111 may transmit the security mode command message to the 5G satellite RAN 104. Further, in the step 1333, the 5G satellite RAN 104 may transmit the security mode command message to the UE 101.

According to an embodiment, in steps 1341 and 1343, the UE 101 may transmit a security mode complete message to the AMF 111. That is, in the steps 1341 and 1343, the UE 101 may transmit the security mode complete message to the AMF 111. Specifically, in the step 1341, the UE 101 may transmit the security mode complete message to the 5G satellite RAN 104. Further, in the step 1343, the 5G satellite RAN 104 may transmit the security mode complete message to the AMF 111.

According to an embodiment, in the steps 1351 and 1353, the AMF 111 may transmit a registration response message to the UE 101.

According to an embodiment, in the steps 1351 and 1353, the AMF 111 may transmit a registration accept or registration reject message to the UE 101. According to an embodiment, the registration accept or registration reject message may be transmitted from the AMF 111 to the UE 101 through the 5G satellite RAN 104.

According to an embodiment, in the steps 1351 and 1353, the registration response message that is transmitted from the AMF to the UE 101 through the 5G satellite RAN 104 may include the registration accept message or the registration reject message.

According to an embodiment of the disclosure, an operation method of an access and mobility management function (AMF) in a wireless communication system may include:

receiving a registration request message for processing an emergency call from a UE through a satellite radio access network (RAN); transmitting an emergency registration request message to a public safety answering point (PSAP) based on the received registration request message; and receiving an emergency registration response message from the PSAP. According to an embodiment, the PSAP that receives the emergency registration response message may be different from a PSAP of a country to which the UE belongs. For example, the PSAP may include the PSAP that can be shared by a plurality of countries in a specific situation, such as an emergency situation or a marine situation rather than the PSAP of the country to which the UE belongs. Further, the PSAP may include the PSAP that can be shared by a plurality of countries in a specific situation, such as an emergency situation or a marine situation, or the PSAP that can be accessed by the UE, rather than the PSAP located near the UE.

Although the detailed embodiments of the disclosure have been described in the detailed description of the disclosure, the disclosure may be modified in various ways without departing from the scope of the disclosure. Accordingly, the scope of the disclosure should not be limited to the above-described embodiments, but should be defined by not only the claims but also equivalents thereof.

INDUSTRIAL APPLICABILITY

The disclosure can be applied to a case for mobility management, connection management, and session management of the user equipment in the mobile communication system.

The invention claimed is:

1. A method performed by a user equipment (UE) in a communication system, the method comprising:
   in case that the UE receives a paging from an access and mobility management function (AMF) in a state of being registered in the AMF, transmitting, to the AMF, a service request message;
   transmitting, to the AMF, a protocol data unit (PDU) session modification request message; and
   in case that a second timer expires before a first timer is stopped, retransmitting, to the AMF, the PDU session modification request message,
   wherein the first timer starts in case that the UE transmits the service request message, and the second timer starts in case that the UE transmits the PDU session modification request message.

2. The method of claim 1, further comprising, as a response to the PDU session modification request message, receiving, from the AMF, a downlink (DL) non-access stratum (NAS) transport message indicating that the PDU session modification request message is not forwarded to a session management function (SMF).

3. The method of claim 2, further comprising retransmitting the PDU session modification request message in case that the second timer expires after the DL NAS transport message is received.

4. A user equipment (UE) in a communication system comprising:
   a transceiver; and
   at least one processor coupled with the transceiver and configured to:
   in case that the UE receives a paging from an access and mobility management function (AMF) in a state of being registered in the AMF, transmit, to the AMF, a service request message, transmit, to the AMF, a protocol data unit (PDU) session modification request message, and in case that a second timer expires before a first timer is stopped, retransmit, to the AMF, the PDU session modification request message, wherein the first timer starts in case that the UE transmits the service request message, and the second timer starts in case that the UE transmits the PDU session modification request message.

5. The UE of claim 4, wherein the at least one processor is further configured to: as a response to the PDU session modification request message, receive, from the AMF, a downlink (DL) non-access stratum (NAS) transport message indicating that the PDU session modification request message is not forwarded to a session management function (SMF).

6. The UE of claim 5, wherein the at least one processor is further configured to retransmit the PDU session modification request message in case that the second timer expires after the DL NAS transport message is received.

7. A method performed by an access and mobility management function (AMF) in a communication system, the method comprising:

transmitting, to a user equipment (UE), a paging;

as a response to the paging, receiving, from the UE, a service request message;

receiving, from the UE, a protocol data unit (PDU) session modification request message; and in case that a second timer expires before a first timer is stopped, receiving, from the UE, a retransmitted PDU session modification request message, wherein the first timer starts in case that the UE transmits the service request message to the AMF, and the second timer starts in case that the UE transmits the PDU session modification request message to the AMF.

8. The method of claim 7, further comprising transmitting, to the UE, a downlink (DL) non-access stratum (NAS)

transport message indicating that the PDU session modification request message is not forwarded to a session management function (SMF).

9. The method of claim 8, further comprising receiving, from the UE, the PDU session modification request message in case that the second timer expires after the DL NAS transport message is transmitted.

10. An access and mobility management function (AMF) in a communication system, the AMF comprising:

a transceiver; and at least one processor coupled with the transceiver and configured to:

transmit, to a user equipment (UE), a paging, as a response to the paging, receive, from the UE, a service request message, receive, from the UE, a protocol data unit (PDU) session modification request message, and in case that a second timer expires before a first timer is stopped, receive, from the UE, a retransmitted PDU session modification request message, wherein the first timer starts in case that the UE transmits the service request message to the AMF, and the second timer starts in case that the UE transmits the PDU session modification request message to the AMF.

11. The AMF of claim 10, wherein the at least one processor is configured to transmit, to the UE, a downlink (DL) non-access stratum (NAS) transport message indicating that the PDU session modification request message is not forwarded to a session management function (SMF).

12. The AMF of claim 11, wherein the at least one processor is configured to receive, from the UE, the PDU session modification request message in case that the second timer expires after the DL NAS transport message is transmitted.

\* \* \* \* \*